US012559412B2

(12) United States Patent (10) Patent No.: US 12,559,412 B2

Foroutan et al. (45) Date of Patent: Feb. 24, 2026

(54) MESOPOROUS PHOSPHATE BASED GLASS

(71) Applicant: University of Surrey, Surrey (GB)

(72) Inventors: Farzad Foroutan, Surrey (GB); Daniela Carta, Surrey (GB)

(73) Assignee: University of Surrey, Surrey (GB)

( * ) Notice: Subject to any disclaimer, the term of this patent is extended or adjusted under 35 U.S.C. 154(b) by 1093 days.

(21) Appl. No.: 17/596,899

(22) PCT Filed: Jun. 26, 2020

(86) PCT No.: PCT/GB2020/051552
§ 371 (c)(1),
(2) Date: Dec. 20, 2021

(87) PCT Pub. No.: WO2020/260892
PCT Pub. Date: Dec. 30, 2020

(65) Prior Publication Data

US 2022/0306519 A1 Sep. 29, 2022

(30) Foreign Application Priority Data

Jun. 28, 2019 (GB) ...................................... 1909342

(51) Int. Cl.
C03C 3/16 (2006.01)
C03C 4/00 (2006.01)

(52) U.S. Cl.
CPC .............. C03C 3/16 (2013.01); C03C 4/0014 (2013.01); C03C 2201/60 (2013.01); C03C 2203/36 (2013.01); C03C 2204/02 (2013.01)

(58) Field of Classification Search
None
See application file for complete search history.

(56) References Cited

U.S. PATENT DOCUMENTS

2003/0064015 A1 4/2003 Yamanaka et al.
2008/0248942 A1 10/2008 Borrelli et al.
(Continued)

FOREIGN PATENT DOCUMENTS

CN 103043901 B 4/2013
CN 103193386 B 7/2013
(Continued)

OTHER PUBLICATIONS

Kaur G, Pickrell G, Sriranganathan N, Kumar V, Homa D. 2016. Review and the state of the art: Sol-gel and melt quenched bioactive glasses for tissue engineering. J Biomed Mater Res Part B 2016: 104B: 1248-1275. (Year: 2016).*
(Continued)

*Primary Examiner* — Elizabeth Collister
(74) *Attorney, Agent, or Firm* — Todd Ostomel

(57) ABSTRACT

The disclosure provides a method of producing a mesoporous phosphate-based glass. The method comprises (a) contacting a phosphate with an alcohol and/or a glycol ether to create a reaction mixture; (b) contacting the reaction mixture with alkali metal cations and/or alkaline earth metal cations; (c) contacting the alcohol, the glycol ether or the reaction mixture with a surfactant, wherein the surfactant is configured to provide channel-like pores in the resultant mesoporous phosphate-based glass; (d) allowing the reaction mixture to gel; and (e) calcinating the gel to obtain the mesoporous phosphate-based glass.

20 Claims, 15 Drawing Sheets

(56) References Cited

U.S. PATENT DOCUMENTS

| | | | | |
|---|---|---|---|---|
| 2009/0208428 A1* | 8/2009 | Hill | ..................... | A61L 27/306 |
| | | | | 424/53 |
| 2014/0271912 A1* | 9/2014 | Pomrink | ................ | C03C 3/097 |
| | | | | 424/602 |
| 2017/0274118 A1* | 9/2017 | Nazhat | ................... | C03C 1/006 |
| 2018/0133251 A1 | 5/2018 | Towler | | |

FOREIGN PATENT DOCUMENTS

| | | | | |
|---|---|---|---|---|
| CN | 105693096 A | 6/2016 | | |
| EP | 2386525 A1 * | 11/2011 | ............. | A61L 27/12 |

OTHER PUBLICATIONS

Carta et al., Structural studies of bioactive sol-gel phosphate based glasses, Physics and Chemistry of Glasses, vol. 46, No. 4, p. 365-371 (Year: 2005).*

Soleimani et al., The effects of CeO2 addition on crystallization behavior and pore size in microporous calcium titanium phosphate glass ceramics, Materials Research Bulletin 47 (2012) pp. 1362-1367 (Year: 2012).*

Examination Report Communication pursuant to Article 94(3) EPC for EP Application No. 20735679.1-1108, 8 pages, dated Mar. 15, 2024.

Asma Tufail Shah et al., "A study of the effect of precursors on physical and biological properties of mesoporous bioactive glass", Journal of Materials Science 50, 1794-1804, 2015, DOI 10.1007/s10853-014-8742-x.

Garg Shikha et al., "Antibacterial and anticancerous drug loading kinetics for (10-x)CuO—xZnO—20CaO—60SiO$_2$—10P$_2$O$_5$(2 ≤x≤ 8) mesoporous bioactive glasses", Journal of Materials Science: Materials in Medicine, Springer New York LLC, United States, vol. 28, No. 1, Dec. 9, 2016 (Dec. 9, 2016), pp. 1-14, XP036147752, ISSN: 0957-4530, DOI: 10.1007/S10856-016-5827-X.

M Gholipourmalekabadi et al., "Silver- and fluoride-containing mesoporous bioactive glasses versus commonly used antibiotics: Activity against multidrug-resistant bacterial strains isolated from patients with burns" 42, 131-140, 2016.

Shan Zhao et al.: "Synthesis of CaO—SiO$_2$—P$_2$O$_5$ mesoporous bioactive glasses with high P$_2$O$_5$ content by evaporation induced self assembly process", Journal of Materials Science: Materials in Medicine, vol. 22, No. 2, Dec. 14, 2010 (Dec. 14, 2010), pp. 201-208, XP055728165, United States ISSN: 0957-4530, DOI: 10.1007/s10856-010-4200-8.

Shruti Shruti et al.: "Mesoporous bioactive scaffolds prepared with cerium-, gallium- and zinc-containing glasses", Acta Biomaterialia, vol. 9, No. 1, Sep. 28, 2012 (Sep. 28, 2012), pp. 4836-4844, XP055231400, Amsterdam, NL ISSN: 1742-7061, DOI: 10.1016/j.actbio.2012.09.024.

Swati Thakur et al., Effect of strontium substitution on the cytocompatibility and 3-D scaffold structure for the xSrO—(10-x)MgO—60SiO$_2$—20CaO—10P$_2$O$_5$ (2≤x≤8) sol-gel glasses Journal of Materials Science: Mater, Med. 28:89, 2017, DOI 10.1007/810856-017-5901-z.

Vaid Chitra et al.: "Mesoporous bioactive glass and glass-ceramics: Influence of the local structure on in vitro bioactivity", Microporous and Mesoporous Materials, Elsevier, Amsterdam, NL, vol. 186, Nov. 23, 2013 (Nov. 23, 2013), pp. 46-56, XP028670075, ISSN: 1387-1811, DOI: 10.1016/J.MICROMESO.2013.11.027.

International Search Report and Written Opinion of PCT/GB2020/051552 dated Dec. 30, 2020, 12 pages.

Great Britain Search Report for patent application No. GB1909342.6 dated Dec. 3, 2019, 7 pages.

Donohue et al., "Adsorption Hysteresis in Porous Solids", Journal of Colloid and Interface Science 205, 121-130 (1998) Article No. CS985639.

Morishige et al., "Nature of Adsorption and Desorption Branches in Cylindrical Pores", Langmuir 2004, 20, 4503-4506. 10.1021/la030414g.

Owens et al., "Sol-gel based materials for biomedical applications", Progress in Materials Science 77 (2016) 1-79; http://dx.doi.org/10.1016/j.pmatsci.2015.12.001.

* cited by examiner

| Wavenumber (cm⁻¹) | Assigments |
|---|---|
| 730 | Us (P-O-P) |
| 900 | Uas (P-O-P) |
| 1100 | Uas $(PO_3)^{-2}$ |
| 1235 | Uas $(PO_2)$ |

MESOPOROUS PHOSPHATE BASED GLASS

CROSS-REFERENCE TO RELATED APPLICATIONS

This application is a national-stage filing under 37 USC 371 (c) of International Application No. PCT/GB2020/051552, filed Jun. 26, 2020, which claims priority to, and the benefit of, European Patent Application GB 1909342.6, filed Jun. 28, 2019, the entire contents of each of which are herein incorporated by reference in their entirety for all purposes.

The present invention relates to a method of producing a mesoporous phosphate based glass, and the glass per se. The invention extends to medical uses of the glass.

Within the past few decades, a wide range of biomaterials have been developed for tissue engineering and drug delivery applications [1, 2]. The production of new materials that resemble the complex hierarchical structures of natural tissues to regenerate and repair of damaged or lost tissues is an extremely attractive field of research, in which remarkable results are beginning to appear [3]. Bioresorbable materials can be engineered as a temporary scaffold for cells to guide their proliferation and differentiation into the desired tissue [4]. Drug molecules can also be delivered to their sites of action via a drug delivery carrier at such a concentration and rate that causes the minimum side effects and maximum therapeutic effects [5]. There should be a proper loading of the drug into an appropriate drug delivery carrier and the carrier must be non-toxic with an adequate residence time in circulation to be able to reach the site of interest. The carriers should also be biodegradable, thereby enabling them to be easily cleared away by the body's physiological mechanisms, and thus avoids any chance of its accumulation within cells that may lead to cytotoxicity.

Recently, a wide range of bioresorbable polymers have been developed. However, just a limited number of them have been approved to be used for biomedical applications such as tissue engineering and drug delivery systems as the long term effects of these polymeric structures are still under investigation [6]. One of the main reasons for their limited applications can be related to the release of polymer fragments with heterogeneous chain-lengths during their degradation that might lead to toxicity. In addition, premature release of drug molecules before reaching a target site can be pharmacologically dangerous [7]. Numerous studies have been performed on mesoporous silica based materials that can provide broad range of advantages such as biocompatibility, high surface area, and high pore volume [8, 9]. The materials are classified as mesoporous due to their pore size, which range between 2 nm and 50 nm. The empty pores of these mesoporous materials can be simply filled by exposing them to a solution containing the drug molecules and allowing the molecules to diffuse therein. Mesoporous silica based glass nanoparticles (MSGNs) have been emerging as a new interesting field for cancer therapy and have the ability to target cancerous cells to deliver the drug by functionalisation of their surface with specific ligands [10].

However, the major disadvantages of MSGNs are attributed to the silanol groups interaction with the surface of the phospholipids of the red blood cell membranes resulting in hemolysis and metabolic changes that may lead to melanoma promotion [11]. In addition, despite the verified biodegradability of silica, the issue of safe and complete exocytosis of MSGNs from the biological system has not been entirely addressed that cause major obstacles impeding their clinical translation [12-14].

Phosphate based glasses are a unique group of amorphous materials which are totally soluble in the human body fluid [15, 16]. For several years, phosphate based glasses containing $Ca^{2+}$ and $Na^+$ ions have been used as a passive host material for the controlled release of metal ions in veterinary treatments. As the ions released from the phosphate based glasses already exist in the body, very low toxicity and good biocompatibility are guaranteed. The degradation rate can be controlled from minutes to several months via changing their composition that offer the potential use of these glasses as a carrier in drug delivery application. Their high biocompatibility and controllable degradation rate can also offer a significant advantage over the current MSGNs drug delivery carriers.

The conventional method to prepare phosphate based glasses is the high temperature melt quenching technique, which prepares a solid precursor at a temperature greater than 1000° C. However, this method often leads to non-homogeneous, bulk glasses that cannot be used for hosting temperature sensitive molecules [17].

The present invention arises from the inventors' work in attempting to overcome the problems associated with the prior art.

In accordance with a first aspect of the invention, there is provided a method of producing a mesoporous phosphate-based glass, the method comprising:

contacting a phosphate with an alcohol and/or a glycol ether to create a reaction mixture;

contacting the reaction mixture with alkali metal cations and/or alkaline earth metal cations;

contacting the alcohol, the glycol ether or the reaction mixture with a surfactant, wherein the surfactant is configured to provide channel-like pores in the resultant mesoporous phosphate-based glass;

allowing the reaction mixture to gel; and calcinating the gel to obtain the mesoporous phosphate-based glass.

Advantageously, the method produces a mesoporous phosphate-based glass with channel-like pores. The inventors have found that a mesoporous phosphate-based glass produced by the above method has a high surface area. Additionally, the pores within the mesoporous phosphate-based glass may be loaded with an active agent, and the glass can then be used as a drug delivery system.

The phosphate may be an organophosphate, and is preferably an alkyl phosphate. Accordingly, the phosphate may have formula $PO(OR^1)_x(OH)_y$, where x is an integer between 1 and 3, y is an integer between 0 and 2 and the sum of x and y is 3. Accordingly, in some embodiments, the phosphate may have formula $PO(OR^1)_3$, $PO(OR^1)_2(OH)$ or $PO(OR^1)(OH)_2$, or a combination thereof. Each $R^1$ group may be a $C_1$-$C_{10}$ alkyl, a $C_1$-$C_{10}$ alkenyl or a $C_1$-$C_{10}$ alkynyl, more preferably a $C_2$-$C_6$ alkyl, a $C_2$-$C_6$ alkenyl or a $C_2$-$C_6$ alkynyl and most preferably is a butyl. The butyl is preferably n-butyl. Accordingly, the phosphate may be $PO(OC_4H_9)_3$, $PO(OC_4H_9)_2(OH)$ or $PO(OC_4H_9)(OH)_2$, or a combination thereof.

The term "alkyl" as used herein, unless otherwise specified, refers to a saturated straight or branched hydrocarbon. "Alkenyl" refers to olefinically unsaturated hydrocarbon groups which can be unbranched or branched. "Alkynyl" refers to acetylenically unsaturated hydrocarbon groups which can be unbranched or branched.

The alcohol may be a $C_1$-$C_5$ alcohol and is preferably methanol or ethanol. Preferably, the alcohol is ethanol. The glycol ether may be a $C_1$-$C_5$ glycol ether, and is preferably 2-methoxyethanol or 2-ethoxyethanol. Preferably, the glycol ether is 2-methoxyethanol.

The phosphate and the alcohol and/or glycol ether are preferably contacted under dry conditions. The phrase "under dry conditions" may be understood to mean in the so absence of water.

The molar ratio of the phosphate to the alcohol and/or glycol ether may between 1:20 and 20:1, more preferably between 1:10 and 5:1 or between 1:5 and 1:1, most preferably between 1:2 and 1:4 or between 1:2.5 and 1:3.5. In a preferred embodiment, the molar ratio of the phosphate to the alcohol and/or glycol ether is 1:3.

The method may comprise contacting the alcohol and/or the glycol ether and the surfactant prior to contacting the phosphate and the alcohol glycol ether. Alternatively, the method may comprise contacting the reaction mixture with the surfactant prior to contacting the reaction mixture with alkali metal cations and/or alkaline earth metal cations. However, in a preferred embodiment, the method comprises contacting the reaction mixture with the surfactant subsequently to contacting the reaction mixture with alkali metal cations and/or alkaline earth metal cations.

After contacting the phosphate with the alcohol and/or glycol ether to create a reaction mixture, and prior to contacting the reaction mixture with alkali metal cations and/or alkaline earth metal cations, the reaction mixture may be allowed to react for at least 30 seconds, more preferably at least 1 minute, at least 2 minutes or at least 3 minutes, and most preferably at least 5 minutes, at least 7.5 minutes or at least 10 minutes. After contacting the phosphate with the alcohol and/or glycol ether to create a reaction mixture, and prior to contacting the reaction mixture with alkali metal cations and/or alkaline earth metal cations, the reaction mixture may be allowed to react for between seconds and 24 hours, between 1 minute and 12 hours, between 2 minutes and 6 hours or between 3 minutes and 1 hour, and most preferably between 5 and 30 minutes, between 7.5 and 20 minutes or between 10 minutes and 20 minutes.

The alkali metal cations may comprise lithium cations, sodium cations, potassium cations and/or rubidium cations. Preferably, the alkali metal cations comprise sodium cations.

The alkaline earth metal cations may comprise beryllium cations, magnesium cations, calcium cations and/or strontium cations. Preferably, the alkaline earth metal cations comprise magnesium cations, calcium cations and/or strontium cations, and more preferably comprise calcium cations.

Preferably, the method comprises contacting the reaction mixture with alkali metal cations and alkaline earth metal cations. Accordingly, the method may comprise contacting the reaction mixture with calcium cations and sodium cations. The alkali metal cations and/or alkaline earth metal cations may be provided with a counter ion. The counter ion may comprise an alkoxide. The alkoxide may have the formula $R^2$—O— or $R^2$—O-L-O$^-$, where $R^2$ is a $C_1$-$C_{10}$ alkyl, a $C_1$-$C_{10}$ alkenyl or a $C_1$-$C_{10}$ alkynyl and L is a $C_1$-$C_{10}$ alkylene or a $C_1$-$C_{10}$ alkylyne. Preferably, $R^2$ is a $C_1$-$C_6$ alkyl, more preferably a $C_1$-$C_4$ alkyl and most preferably a $C_1$-$C_2$ alkyl. In some embodiments, R is methyl. Preferably, L is a $C_1$-$C_6$ alkylene, more preferably a $C_1$-$C_4$ alkylene and most preferably a $C_1$-$C_2$ alkylene. In some embodiments, L is ethylene. Accordingly, the counter ions may comprise a methoxy anion and/or a methoxyethoxy anion. In some embodiments, the alkaline earth metal cation is provided with a methoxyethoxide counter ion. In embodiments where the alkaline earth metal cation is a calcium cation, the alkaline earth metal cations may be provided as calcium methoxyethoxide. In some embodiments, the alkali metal cation is provided with a methoxide counter ion. In embodiments where the alkali metal cation is a sodium cation, the alkali metal cations may be provided as sodium methoxide.

The term "alkylene", as used herein, unless otherwise specified, refers to a bivalent saturated straight or branched hydrocarbon. The term "alkylyne", as used herein, unless otherwise specified, refers to a bivalent unsaturated straight or branched hydrocarbon. The unsaturated straight or branched hydrocarbon may be olefinically unsaturated and/or acetylenically unsaturated, i.e. it may contain double and/or triple bonds.

The molar ratio of the alkaline earth metal cation to the phosphate may between 1:50 and 50:1, more preferably between 1:25 and 10:1 or between 1:15 and 1:1, most preferably between 1:10 and 4:10, between 3:15 and 3:8 or between 3:12 and 3:10. In a preferred embodiment, the molar ratio of the calcium cation to the phosphate is 3:11.

The molar ratio of the alkali metal cation to the phosphate may between 1:1000 and 50:1, more preferably between 1:500 and 10:1 or between 1:30 and 1:1, most preferably between 1:20 and 3:10, between 1:15 and 3:8 or between 1:11 and 3:11.

After contacting the reaction mixture with the alkali metal cations and/or alkaline earth metal cations, and prior to contacting the reaction mixture with the surfactant, the reaction mixture may be allowed to react for at least 1 minute, more preferably at least 5 minute, at least 10 minutes or at least 15 minutes, and most preferably at least 30 minutes, at least 45 minutes or at least 1 hour. After contacting the reaction mixture with the alkali metal cations and/or alkaline earth metal cations, and prior to contacting the reaction mixture with the surfactant, the reaction mixture may be allowed to react for between 1 minute and 48 hours, between 5 minutes and 24 hours, between 10 minutes and 12 hours or between 15 minutes and 6 hours, and most preferably between 30 minutes and 4 hours, between 45 minutes and 3 hours or between 1 and 2 hours.

After contacting the reaction mixture with the alkali metal cations and/or alkaline earth metal cations, and prior to contacting the reaction mixture with the surfactant, the reaction mixture may be stirred continuously. The method may comprise contacting the reaction mixture with an antimicrobial agent.

Preferably, the method comprises contacting the reaction mixture with the antimicrobial agent prior to contacting the reaction mixture with the surfactant. The method may comprise contacting the reaction mixture with the antimicrobial agent after the reaction mixture has been contacted with alkali metal cations and/or alkaline earth metal cations, and optionally after the reaction mixture has been allowed to react, as defined above. The antimicrobial agent may comprise a metal or metal cation. The metal or metal cation may be a transition metal, a p-block metal or a cation thereof. The metal or metal cation may comprise copper, zinc, strontium, silver, gallium, cerium or a cation thereof. The metal cation may be provided in the form of a metal oxide, metal acetate or metal nitrate, e.g. copper oxide, zinc oxide, strontium oxide, copper acetate, zinc acetate, strontium acetate, silver acetate or gallium acetate.

The molar ratio of the antimicrobial agent to the phosphate may between 1:1000 and 50:1, more preferably between 1:500 and 10:1 or between 1:250 and 1:1, most preferably between 1:100 and 1:5, between 1:40 and 1:6 or between 1:30 and 1:7.

After contacting the reaction mixture and the antimicrobial agent, and prior to contacting the reaction mixture with the surfactant, the reaction mixture may be allowed to react for at least 30 seconds, more preferably at least 1 minute, at least 2 minutes or at least 3 minutes, and most preferably at least 5 minutes, at least 7.5 minutes or at least 10 minutes. After contacting the reaction mixture and the antimicrobial agent, and prior to contacting the reaction mixture with the surfactant, the reaction mixture may be allowed to react for between 30 seconds and 24 hours, between 1 minute and 12 hours, between 2 minutes and 6 hours or between 3 minutes and 1 hour, and most preferably between 5 and 30 minutes, between 7.5 and 20 minutes or between 10 minutes and 20 minutes.

After contacting the reaction mixture and the antimicrobial agent, and prior to contacting the reaction mixture with the surfactant, the reaction mixture may be stirred continuously.

In embodiments where the method comprises contacting the reaction mixture with an antimicrobial agent, the method may comprise contacting the reaction mixture with the surfactant prior to, simultaneously to or subsequently to contacting the reaction mixture with an antimicrobial agent. However, in a preferred embodiment, the method comprises contacting the reaction mixture with the surfactant subsequently to contacting the reaction mixture with an antimicrobial agent.

The molar ratio of the phosphate to the surfactant may between 1:1 and 1,000:1, more preferably between 5:1 and 500:1 or between 10:1 and 100:1, most preferably between 12.5:1 and 50:1, between 15:1 and 40:1 or between 17.5:1 and 30:1. In a preferred embodiment, the molar ratio of the phosphate to the alcohol and/or glycol ether is about 21:1.

The surfactant may be a copolymer, preferably a triblock copolymer, and most preferably a symmetric triblock copolymer. The copolymer may comprise a hydrophobic core and hydrophilic end groups. The core may comprise poly(propylene glycol) (PPG). The end groups may comprise poly (ethylene glycol) (PEG). Accordingly, the copolymer may comprise poly(ethylene glycol)-block-poly(propylene glycol)-block-poly(ethylene glycol) (PEG-PPG-PEG). It may be appreciated that this copolymer can be referred to as Pluronic® P-123, Pluronic® F-68, Pluronic® F-87 or Pluronic® F-127.

The copolymer may have a molar mass between 500 and 50,000 or between 1,000 and 25,000, more preferably between 2,000 and 20,000, between 3,000 and 15,000 or between 4,000 and 10,000, and most preferably between 4,500 and 9,000, between 5,000 and 7,500 or between 5,500 and 6,000.

The surfactant may be provided in a solution. Accordingly, contacting the reaction mixture with surfactant may comprise contacting the reaction mixture with a surfactant solution, wherein the surfactant solution comprises the surfactant and a solvent. The solvent may comprise an alcohol, a glycol ether and/or water. The alcohol may be a $C_1$-$C_5$ alcohol. The alcohol is preferably methanol or ethanol, and more preferably is ethanol. The glycol ether may be a $C_1$-$C_5$ glycol ether. The glycol ether may be 2-methoxyethanol or 2-ethoxyethanol, and is preferably 2-methoxyethanol.

The surfactant solution preferably comprises the surfactant in an amount between 1 and 99% (w/v), more preferably in an amount between 5 and 80% (w/v), between 10 and 70% (w/v) or between 20 and 60% (w/v), and most preferably in an amount between 30 and 50% (w/v) or between 35 and 45% (w/v).

Preferably, the surfactant solution comprises:
the surfactant;
an alcohol and/or a glycol ether; and
water.

More preferably, the surfactant solution comprises the surfactant, an alcohol and water.

Preferably, the volumetric ratio of the alcohol and/or a glycol ether to the water in the is surfactant solution is between 1:20 and 20:1, more preferably between 1:10 and 10:1 or between 1:5 and 7:1, most preferably between 1:2 and 5:1 or between 1:1 and 3:1. In a preferred embodiment, the volumetric ratio of the alcohol and/or a glycol ether to the water is 2:1.

After contacting the alcohol, the glycol ether or the reaction mixture with the surfactant, and prior to allowing the reaction mixture to gel, the reaction mixture may be allowed to react for at least 30 seconds, more preferably at least 1 minute, at least 2 minutes or at least 3 minutes, and most preferably at least 5 minutes, at least 7.5 minutes or at least 10 minutes. After contacting the alcohol, the glycol ether or the reaction mixture with the surfactant, and prior to allowing the reaction mixture to gel, the reaction mixture may be allowed to react for between 30 seconds and 24 hours, between 1 minute and 12 hours, between 2 minutes and 6 hours or between 3 minutes and 1 hour, and most preferably between 5 and 30 minutes, between 7.5 and 20 minutes or between 10 minutes and 20 minutes.

After contacting the alcohol, the glycol ether or the reaction mixture with the surfactant, and prior to allowing the reaction mixture to gel, the reaction mixture may be stirred continuously.

Allowing the reaction mixture to gel may comprise stopping the stirring of the reaction mixture. The reaction mixture may be allowed to gel at a temperature between −10° C. and 100° C., more preferably at a temperature between 0° C. and 50° C. or between 5° C. and 40° C., most preferably at a temperature between 10° C. and 30° C. or between 15° C. and 25° C.

After the reaction mixture has gelled, the method may comprise aging the gel. The gel may be aged for at least 30 minutes, more preferably at least 1 hour, at least 6 hours or at least 12 hours. The gel may be aged for between 30 minutes and 30 days, between 1 hour and 7 days, between 6 hours and 4 days or between 12 hours and 2 days. The gel may be aged at a temperature between −10° C. and 100° C., more preferably at a temperature between 0° C. and 50° C. or between 5° C. and 40° C., most preferably at a temperature between 10° C. and 30° C. or between 15° C. and 25° C.

Prior to calcinating the gel, the method may comprise drying the gel. Drying the gel may comprise holding the gel at an elevated temperature between 20° C. and 300° C., more preferably at a temperature between 25° C. and 200° C. or between 30° C. and 150° C., most preferably at a temperature between 35° C. and 130° C. Drying the gel may comprise holding the gel at the elevated temperature for at least 1 hour, more preferably at least 12 hours or at least 24 hours, and most preferably at least 2 days, at least 4 days or at least 6 days. Drying the gel may comprise holding the gel at the elevated temperature for between 1 hour and 100 days, between 12 hours and 50 days or between 24 hours and 25 days, and most preferably between 2 and 20 days, between 4 and 14 days or between 6 and 8 days.

Drying the gel may comprise holding the gel at a first elevated temperature. The first elevated temperature may be between 20° C. and 100° C., more preferably at a temperature between 25° C. and 80° C. or between 30° C. and 6° C., most preferably at a temperature between 35° C. and 50° C. Drying the gel may comprise holding the gel at the first elevated temperature for at least 1 hour, more preferably at least 6 hours or at least 12 hours, and most preferably at least 24 hours. Drying the gel may comprise holding the gel at the first elevated temperature for between 1 hour and 20 days, between 6 hours and 10 days or between 12 hours and 5 days, and most preferably between 1 and 2 days.

Subsequent to holding the gel at the first elevated temperature, drying the gel may comprise holding the gel at a second elevated temperature. The second elevated temperature may be between 30° C. and 120° C., more preferably at a temperature between 40° C. and 100° C. or between 50° C. and 80° C., most preferably at a temperature between 55° C. and 70° C. Drying the gel may comprise holding the gel at the second elevated temperature for at least 1 hour, more preferably at least 6 hours or at least 12 hours, and most preferably at least 24 hours, at least 36 hours or at least 48 hours. Drying the gel may comprise holding the gel at the second elevated temperature for between 1 hour and 50 days, between 6 hours and 30 days or between 12 hours and 20 days, and most preferably between 1 and 10 days, between 1.5 and 5 days or between 2 and 4 days.

Subsequent to holding the gel at the second elevated temperature, drying the gel may comprise holding the gel at a third elevated temperature. The third elevated temperature may be between 40° C. and 150° C., more preferably at a temperature between 60° C. and 120° C. or between 70° C. and 100° C., most preferably at a temperature between 75° C. and 90° C. Drying the gel may comprise holding the gel at the third elevated temperature for at least 1 hour, more preferably at least 6 hours or at least 12 hours, and most preferably at least 24 hours, at least 36 hours or at least 48 hours. Drying the gel may comprise holding the gel at the third elevated temperature for between 1 hour and 50 days, between 6 hours and 30 days or between 12 hours and 20 days, and most preferably between 1 and 10 days, between 1.5 and 5 days or between 2 and 4 days.

Subsequent to holding the gel at the third elevated temperature, drying the gel may comprise holding the gel at a fourth elevated temperature. The fourth elevated temperature may be between 80° C. and 300° C., more preferably at a temperature between 100° C. and 200° C. or between 110° C. and 150° C., most preferably at a temperature between 115° C. and 130° C. Drying the gel may comprise holding the gel at the third elevated temperature for at least 1 hour, more preferably at least 6 hours or at least 12 hours, and most preferably at least 24 hours. Drying the gel may comprise holding the gel at the third elevated temperature for between 1 hour and 20 days, between 6 hours and 10 days or between 12 hours and 5 days, and most preferably between 1 and 2 days.

Calcinating the gel may comprise exposing the gel to a further elevated temperature. The further elevated temperature may be between 100° C. and 1,000° C., more preferably at a temperature between 150° C. and 500° C. or between 200° C. and 400° C., most preferably at a temperature between 250° C. and 350° C. or between 275° C. and 325° C.

Calcinating the gel may comprise gradually increasing the temperature to the further elevated temperature. The temperature may be increased at a rate of between 0.01 and 20° C./min, more preferably at a rate of between 0.1 and 10° C./min or between 0.4 and 5° C./min, and most preferably at a rate between 0.6 and 3° C./min or between 0.8 and 1.5° C./min.

Advantageously, drying the gel in stages and slowly raising the heat for calcination prevents collapse of the porous structure.

The method may comprise loading the phosphate-based glass with an organic molecule. The method may comprise loading the phosphate-based glass with the organic molecule subsequently to calcinating the gel. The method may comprise exposing the phosphate-based glass to a solution comprising a solvent and the organic molecule. The solvent may comprise an alcohol, a glycol ether and/or water. The solvent preferably comprises or consists of an alcohol. The alcohol may be a $C_1$-$C_5$ alcohol. The alcohol is preferably methanol or ethanol, and more preferably is ethanol. The glycol ether may be a $C_1$-$C_5$ glycol ether. The glycol ether may be 2-methoxyethanol or 2-ethoxyethanol, and is preferably 2-methoxyethanol. The solution may comprise the organic molecule in an amount between 0.01 and 20 wt %, more preferably between 0.1 and 10 wt % or between 0.5 and 5 wt %, and most preferably between 0.75 and 2 wt %.

The organic molecule is preferably an active pharmaceutical. Accordingly, the organic molecule may have antimicrobial properties. The organic molecule may have a molecular weight between 10 and 10,000 g/mol, more preferably between 50 and 1,000 g/mol, between 100 and 800 g/mol or between 200 and 600 g/mol, and most preferably between 300 and 500 g/mol or between 400 and 450 g/mol. In some embodiments, the organic molecule is a tetracycline or a salt or solvate thereof.

In accordance with the second aspect, there is provided a mesoporous phosphate-based glass obtained or obtainable by the method of the first aspect.

In accordance with a third aspect, there is provided a phosphate-based glass comprising pores with an average diameter of between 2 and 50 nm, wherein the pores are channel-like.

Preferably, the phosphate-based glass of the third aspect is produced using the method of the second aspect.

Preferably, the pores have an average diameter between 3 and 40 nm, more preferably between 4 and 30 nm, between 6 and 25 nm or between 8 and 20 nm, and most preferably between 10 and 15 nm or between 11 and 13 nm.

Preferably, the phosphate based glass comprises phosphorus pentoxide. Preferably, the phosphate-based glass comprises between 10 and 90 mol % phosphorus pentoxide, more preferably between 20 and 80 mol %, between 30 and 75 mol % or between 40 and 70 mol % phosphorus pentoxide, and most preferably between 45 and 65 mol % or between 50 and 60 mol % phosphorus pentoxide.

Preferably, the phosphate-based glass comprises an alkaline earth metal oxide. The alkaline earth metal may be as defined in relation to the first aspect. Accordingly, the alkaline earth metal oxide may be magnesium oxide, calcium oxide or strontium oxide, and is preferably calcium oxide. Preferably, the phosphate-based glass comprises between 5 and 60 mol % alkaline earth metal oxide, more preferably between 10 and 50 mol % or between 20 and 40 mol % alkaline earth metal oxide and most preferably between 25 and 35 mol % alkaline earth metal oxide.

Preferably, the phosphate-based glass comprises an alkali metal oxide. The alkali metal may be as defined in relation to the first aspect. Accordingly, the alkali metal oxide may be sodium oxide. Preferably, the phosphate-based glass comprises between 1 and 50 mol % alkali metal oxide, more preferably between 2.5 and 30 mol % or between 5 and mol % alkali metal oxide and most preferably between 10 and 15 mol % alkali metal oxide.

Optionally, the phosphate-based glass comprises an antimicrobial agent. The antimicrobial agent may be as defined in relation to the first aspect. Preferably, the phosphate-based glass comprises between 0.01 and 20 mol % of the antimicrobial agent, more preferably between 0.1 and 15 mol % or between 0.5 and 12 mol % of the antimicrobial agent and most preferably between 1 and 10 mol % of the antimicrobial agent.

It may be appreciated that the pores of the phosphate-based glass may be loaded with an organic molecule. For instance, the organic molecule may be an active pharmaceutical. The organic molecule may be as defined in relation to the first aspect.

Preferably, the phosphate-based glass does not comprise an organic compound other than ones loaded in the pores. Accordingly, the phosphate-based glass may not comprise an organic compound which forms an integral part of the structure thereof. Preferably, the phosphate-based glass does not comprise a citrate.

Preferably, the phosphate-based glass is amorphous. A phosphate-based glass may be considered to be amorphous if a wide angle x-ray powder diffraction spectrum of the glass has no Bragg peaks.

Preferably, the phosphate-based glass has a high degree of connectivity. The phosphate-based glass may be considered to have a high degree of connectivity if a Fourier-transform infrared (FTIR) spectra of the glass indicates the presence of $Q^1$ and $Q^2$ species. A $Q^1$ species may be indicated by a peak in the FTIR spectra between 1,025 and 1,150 cm$^1$, preferably between 1,050 and 1,125 cm$^1$, and most preferably at about 1,100 cm$^{-1}$. A $Q^2$ species may be indicated by a peak in the FTIR spectra between 800 and 975 cm$^1$, preferably between 850 and 925 cm$^1$, and most preferably at about 900 cm$^{-1}$. Alternatively, or additionally, a $Q^2$ species may be indicated by a peak in the FTIR spectra between 1,175 and 1,350 cm$^1$, preferably between 1,200 and 1,300 cm$^1$, and most preferably at about 1,235 cm$^{-1}$.

In accordance with a fourth aspect, there is provided the phosphate-based glass of the so second or third aspects for use in therapy.

In accordance with a fifth aspect, there is provided the phosphate-based glass of the second or third aspect for use in (a) treating a microbial infection, (b) drug delivery, (c) bone regeneration and/or (d) wound healing.

In accordance with a sixth aspect, there is provided a method of (a) treating a microbial infection, (b) drug delivery, (c) bone regeneration and/or (d) wound healing, the method comprising administering the phosphate-based glass of the second or third aspect to a patient in need thereof.

The microbial infection may be a bacterial infection. The bacterial infection may be a Gram-positive or a Gram-negative bacterial infection. The bacterial infection may be caused by *Staphylococcus aureus* or *Escherichia coli*.

Bone regeneration and wound healing may comprise the regeneration of hard tissue and/or the regeneration of soft tissue.

All of the features described herein (including any accompanying claims, abstract and drawings), and/or all of the steps of any method or process so disclosed, may be combined with any of the above aspects in any combination, except combinations where at least some of such features and/or steps are mutually exclusive.

For a better understanding of the invention, and to show how embodiments of the same may be carried into effect, reference will now be made, by way of example, to the accompanying Figures, in which:—

FIG. 1 shows X-ray powder diffraction (XRD) patterns of the undoped non porous phosphate-based glass (PG), undoped mesoporous phosphate-based glass (MPG) and mesoporous phosphate-based glasses doped with copper ions 1, 3, 5 mol % (Cu1, Cu3 and Cu5), zinc ions 1, 3, 5 mol % (Zn1, Zn3 and Zn5) and strontium ions 1, 3, 5 mol % (Sr1, Sr3 and Sr5);

Figure 9:
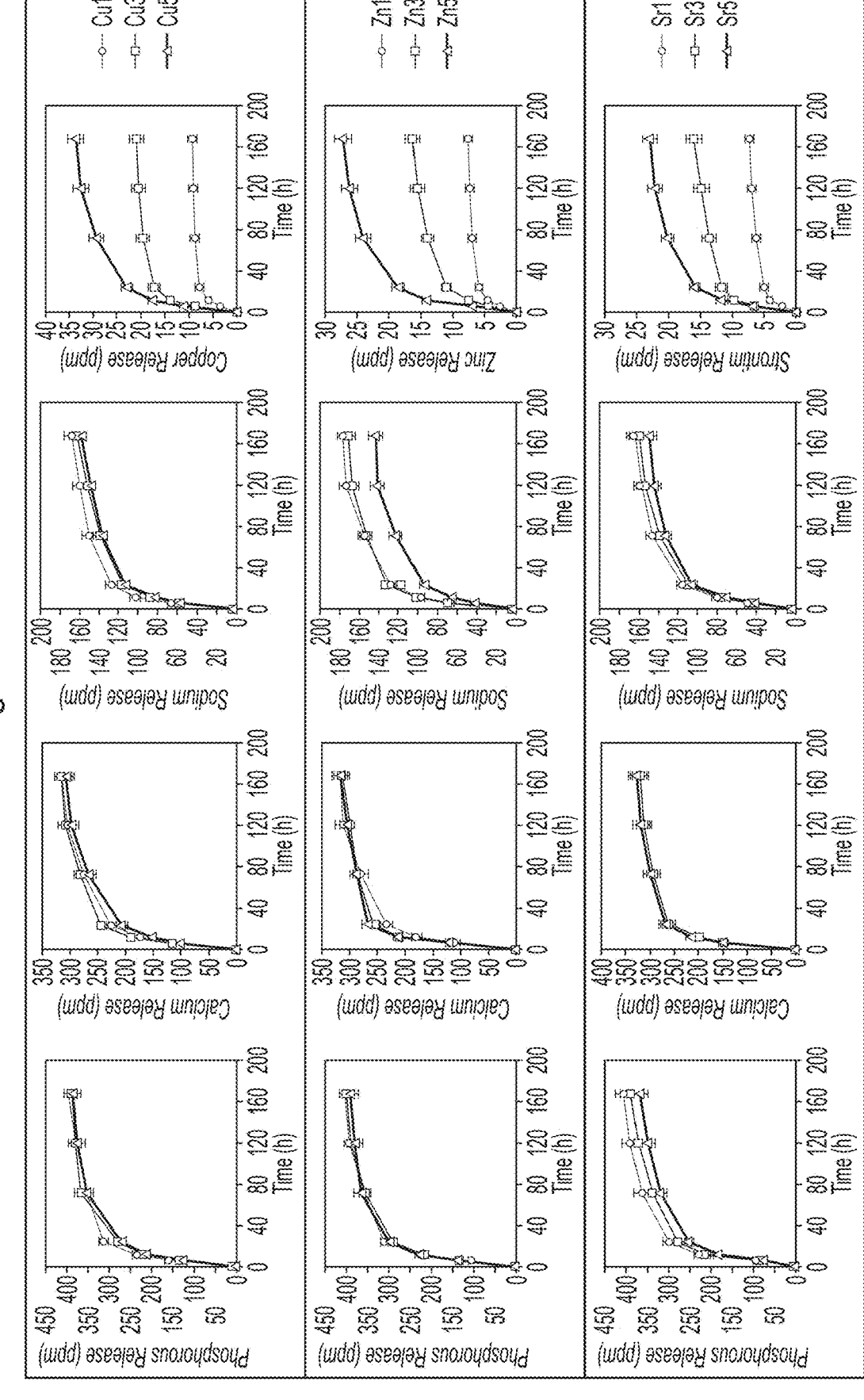
Figure 10:
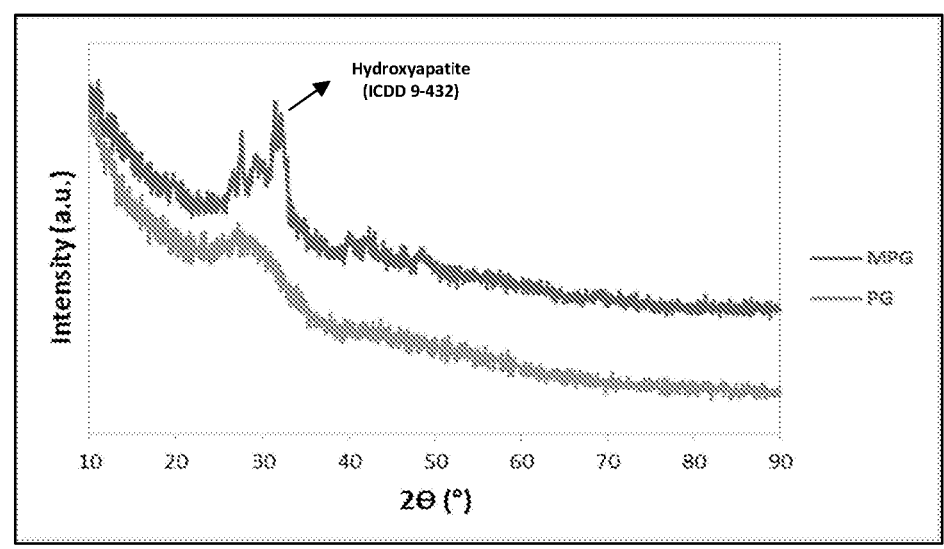
Figure 11:
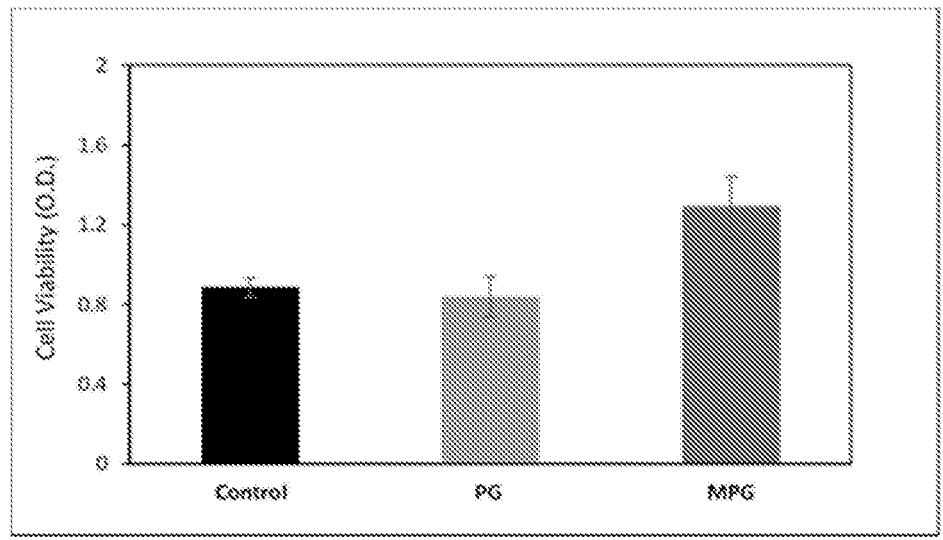
Figure 12:
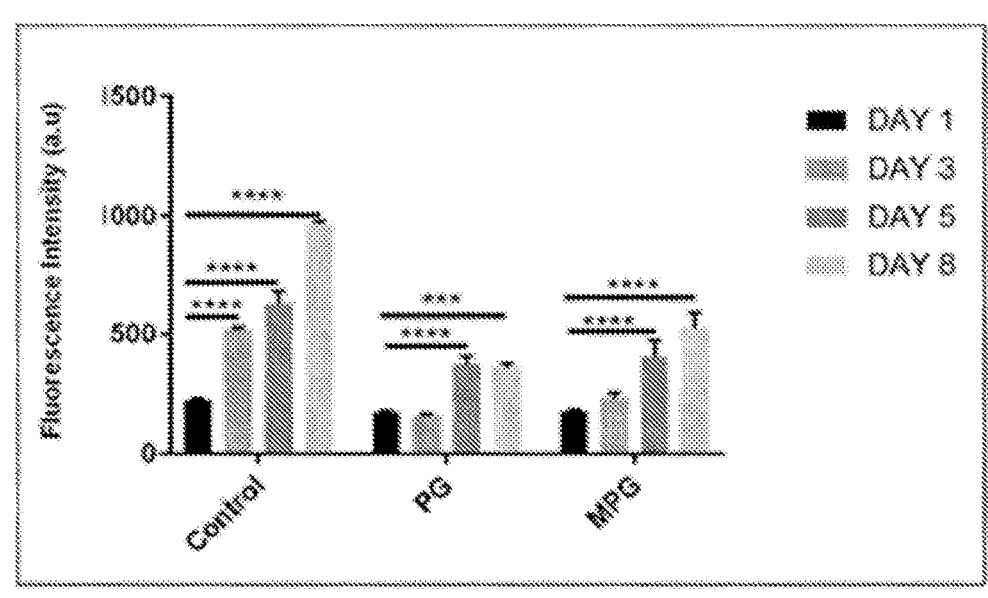
Figure 13:
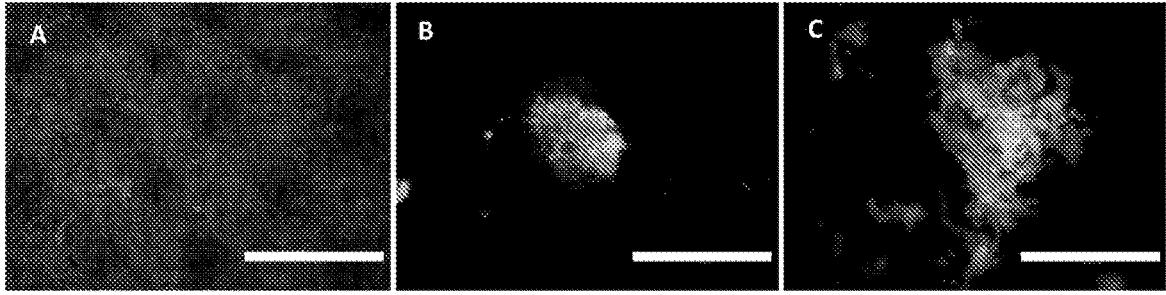
Figure 14:
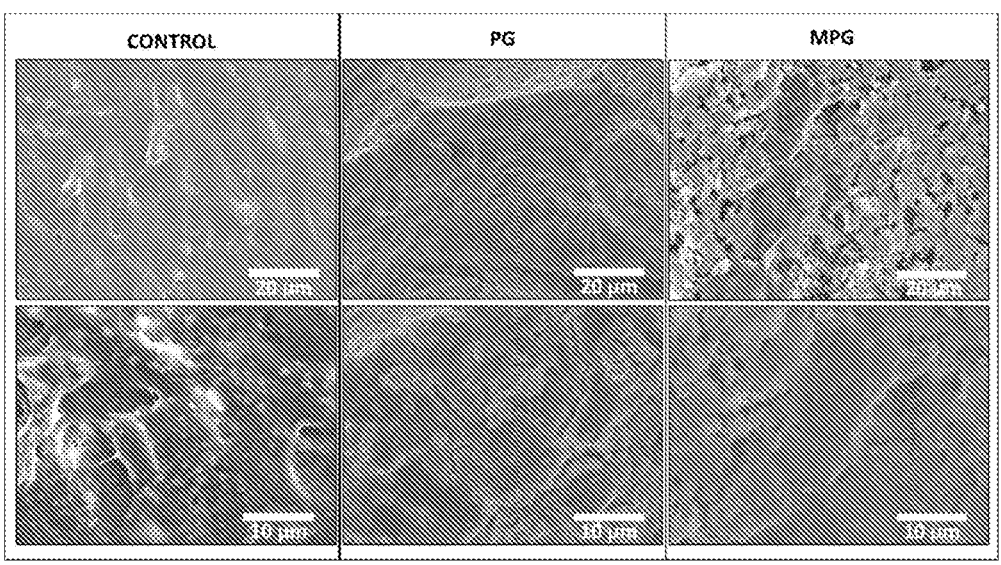
Figure 15:
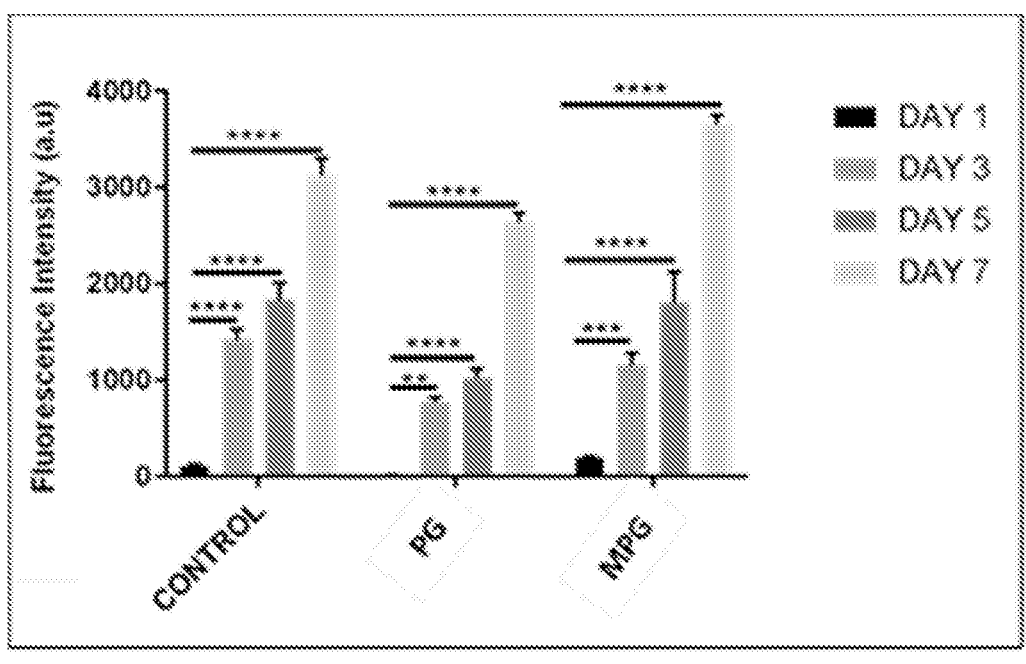
Figure 16:
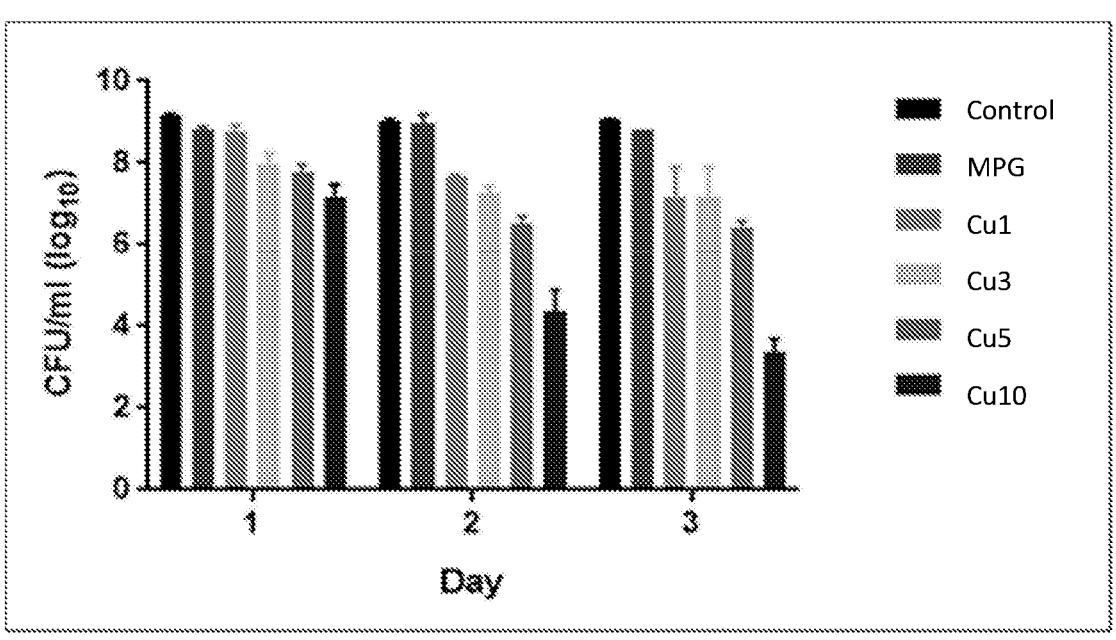
Figure 17:
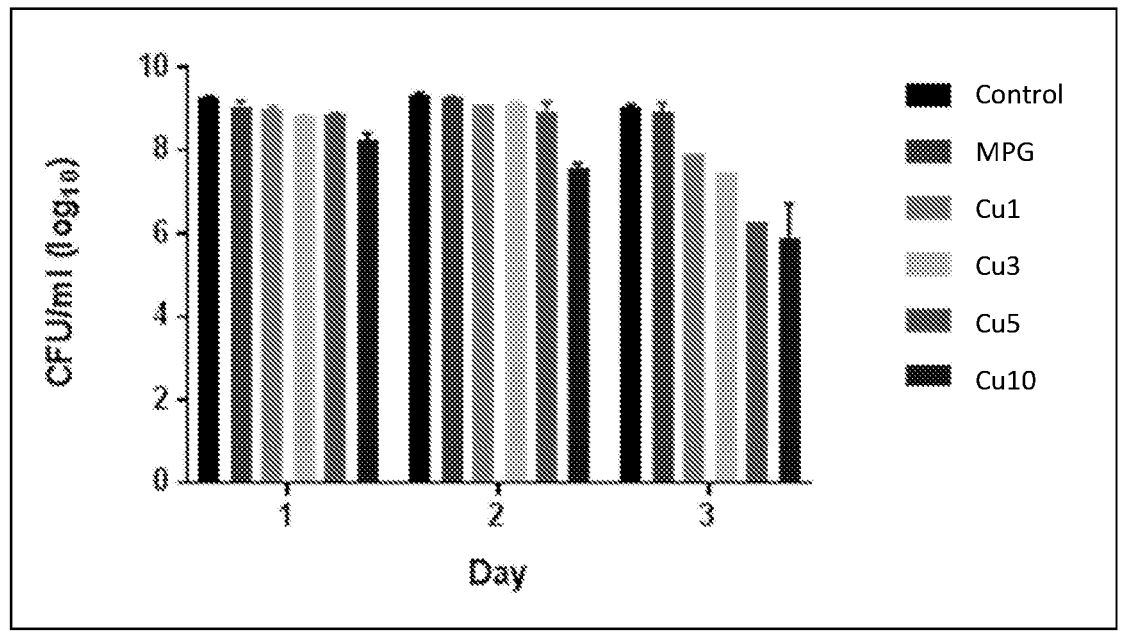
Figure 18:
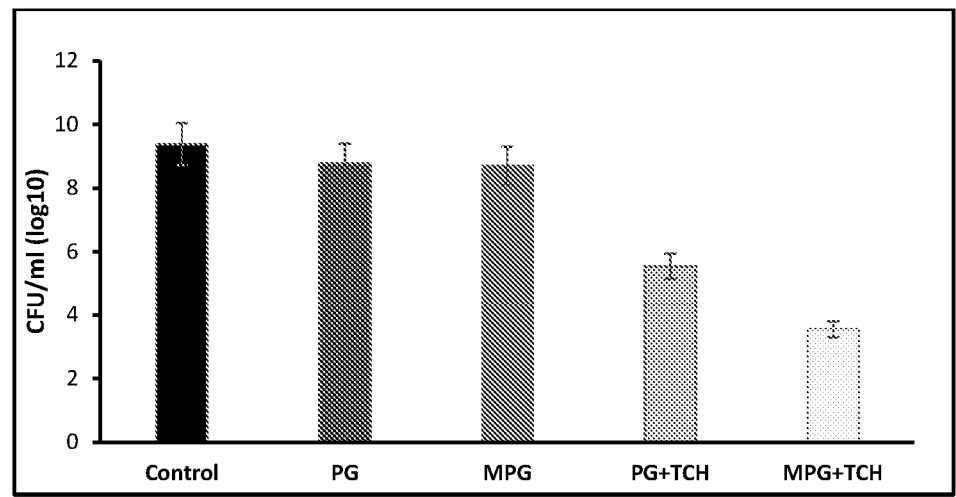
Figure 19:
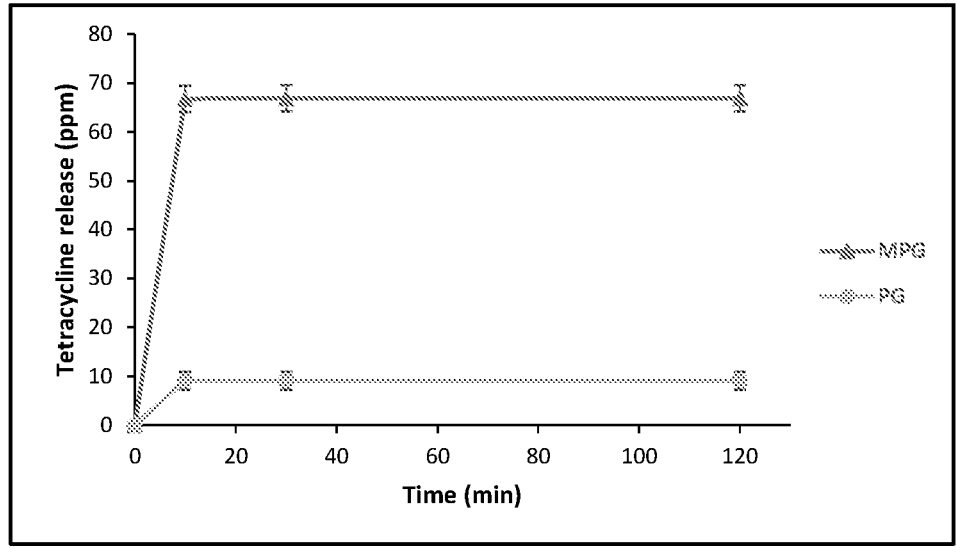

FIGS. 8*a-c* show the release of (a) P, (b) Ca and (c) Na when the undoped glasses are immersed in deionised water for 7 days, the results are measured using inductively coupled plasma—optical emission spectroscopy (ICP-OES); and FIG. 8*d* shows a pH study for the undoped glasses when they are immersed in deionised water for 7 days;

FIG. 9 show the release of P, Ca and Na and the dopant ion (Cu, Zn and Sr, respectively) doped glasses are immersed in deionised water up to 7 days, the results are measured using ICP-OES;

FIG. 10 shows XRD patterns of the undoped glasses after immersion in simulated body fluid (SBF) for 24 h at 37° C.;

FIG. 11 shows cell viability assay results after 24 h contact of fibroblast cells with 1 mg/mL of PG and MPG powders, error bars are standard deviation (SD) (n=3);

FIG. 12 shows Saos-2 cell viability measurement using the Alamar blue fluorescence assay for PG and MPG after 1, 3, 5 and 8 days, error bars are standard deviation (SD) (n=3);

FIG. 13 shows fluorescent microscopic micrographs of Saos-2 cells stained by DAPI after 8 days for (a) control, (b) PG, and (c) MPG. The green fluorescent stain shows filamentous actin and the blue one shows nuclei. Scale bar=400 μm;

FIG. 14 shows SEM images showing Saos-2 cell attachment after 8 days for control (cells on cell culture support), PG and MPG;

FIG. 15 shows Hacat cell viability measurement using the Alamar blue fluorescence assay for PG and MPG after 1, 3, 5 and 7 days. Error bars are SD (n=3);

FIG. 16 shows the results of an ADM test showing the *S. aureus* viability when exposed to mesoporous glasses containing increasing concentrations of Cu. The bacterial viability is expressed as $\log_{10}$ CFU/mL and data are mean f SD with statistical analysis (Two-way ANOVA for each time point);

FIG. 17 shows the results of an ADM test showing the *E. coli* viability when exposed to mesoporous glasses containing increasing concentrations of Cu. The bacterial viability is expressed as $\log_{10}$ CFU/mL and data are mean f SD with statistical analysis (Two-way ANOVA for each time point);

FIG. 18 shows the results of an ADM test showing the *S. aureus* viability when exposed to PG and MPG samples loaded with tetracycline hydrochloride (TCH) after 24 h. The bacterial viability is expressed as $\log_{10}$ CFU/mL and data are mean f SD with statistical analysis (Two-way ANOVA for each time point); and FIG. 19 shows the amount of TCH released from loaded PG and MPG sampled when immersed in deionised water for 10, 30 and 120 minutes.

EXAMPLE 1—SYNTHESIS AND CHARACTERISATION OF UNDOPED NON POROUS PHOSPHATE-BASED GLASS (PG), UNDOPED MESOPOROUS PHOSPHATE-BASED GLASS (MPG) AND DOPED MESOPOROUS PHOSPHATE-BASED GLASS

Materials and Methods

Materials

The following chemical precursors have been used without further purification; n-butyl phosphate (1:1 molar ratio of mono $OP(OH)_2(OBun)$ and di-butyl phosphate $OP(OH)$ $(OBun)_2$, Alfa Aesar, 98%), calcium methoxyethoxide (Ca-methoxyethoxide, ABCR, 20% in methoxyethanol), sodium methoxide solution (NaOMe, Aldrich, 30 wt % in methanol), copper(II) acetate (Cu-acetate, Aldrich, 98%), zinc acetate (Zn-acetate, Aldrich, 98%), strontium acetate (Sr-acetate, Aldrich, 97%), ethanol (EtOH, Fisher, 99%), and Pluronic (P123–$M_n$=5800, Aldrich).

Synthesis Method a) Synthesis of Phosphate-Based Glass (PG)

1.7 g n-butyl phosphate ($PO(OC_4H_9)(OH)_2$) was diluted in 5 ml EtOH and allowed to react for 10 minutes (the whole reaction being carried out in a dried vessel). Following that 3.5 g Ca-methoxyethoxide and 0.5 g NaOMe were added dropwise into the mixture while it was magnetically stirred, and stirring was continued for about 1 h.

The reaction was poured into a glass container and allowed to gel at room temperature. The mixture turned to gel after about 10 minutes and was then aged for 1 day at room temperature. Following that the gel was dried by increasing the temperature to 40° C. and holding it for 1 day, the temperature was then increased to 60° C. and held for 2 days, the temperature was then increased to 80° C. and held for 2 days and then to 120° C. and held for 1 day.

After the drying step, calcination was conducted to remove any remaining surfactant and solvents from the sample. The temperature was increased to 300° C., with the heat being increased at a rate of 1° C./min to prevent the collapse of the porous structure. The sample was held at 300° C. for one hour, and then allowed to cool.

b) Synthesis of Undoped Mesoporous Phosphate-Based Glass (MPG)

1.7 g n-butyl phosphate, comprising a mixture of butyl phosphate ($PO(OC_4H_9)(OH)_2$) and dibutyl phosphate ($PO(OC_4H_9)_2(OH)$)) was diluted in 5 ml EtOH and allowed to react for 10 minutes (the whole reaction being carried out in a dried vessel). Following that 3.5 g Ca-methoxyethoxide and 0.5 g NaOMe were added dropwise into the mixture while it was magnetically stirred, and stirring was continued for about 1 h.

A solution consisting of 3.0 g P123, 5 ml EtOH and 2.5 ml $H_2O$ was then added to the reaction mixture and allowed to react for 10 min. The reaction was stirred continuously for this time.

The mixture was then poured into a glass container, dried and calcinated as described above.

c) Synthesis of Doped Mesoporous Phosphate-Based Glasses 1.7 g n-butyl phosphate ($PO(OC_4H_9)(OH)_2$) was diluted in 5 ml EtOH and allowed to react for 10 minutes (the whole reaction being carried out in a dried vessel). Following that 3.5 g Ca-methoxyethoxide and NaOMe were added dropwise into the mixture while it was magnetically stirred, and stirring was continued for about 1 h. The quantities of NaOMe used varied for the different samples, and can be calculated from table 1 below.

Cu, Zn, or Sr-doped glasses were prepared by adding Cu-acetate, Zn-acetate or Sr-acetate, respectively, to the mixture and allowed to react for 10 min. The quantities of Cu-acetate, Zn-acetate or Sr-acetate used to prepare each sample may be calculated from table 1.

TABLE 1

Composition of undoped and doped phosphate-based glasses in mol %

| Sample | $P_2O_5$ | CaO | $Na_2O$ | CuO | ZnO | SrO |
|---|---|---|---|---|---|---|
| PG | 55 | 30 | 15 | — | — | — |
| MPG | 55 | 30 | 15 | — | — | — |
| $Cu_1$ | 55 | 30 | 14 | 1 | — | — |
| $Cu_3$ | 55 | 30 | 12 | 3 | — | — |
| $Cu_5$ | 55 | 30 | 10 | 5 | — | — |
| $Zn_1$ | 55 | 30 | 14 | — | 1 | — |
| $Zn_3$ | 55 | 30 | 12 | — | 3 | — |
| $Zn_5$ | 55 | 30 | 10 | — | 5 | — |
| $Sr_1$ | 55 | 30 | 14 | — | — | 1 |
| $Sr_3$ | 55 | 30 | 12 | — | — | 3 |
| $Sr_5$ | 55 | 30 | 10 | — | — | 5 |

A solution consisting of 3.0 g P123, 5 ml EtOH and 2.5 ml $H_2O$ was then added to the reaction mixture and allowed to react for 10 min.

The mixture was then poured into a glass container, dried and calcined as described above.

The obtained sol-gel glasses were ground at 10 Hz to form powders (MM301 milling machine, Retsch GmbH, Hope, UK). The resultant powders were then characterised as described below.

Characterisation

Wide Angle X-Ray Powder Diffraction (WA-XRD)

WA-XRD (PANalytical X'Pert, Royston, UK) was performed on powdered samples in a flat plate geometry using Ni filtered Cu Kα radiation. Data was collected using a PIXcel-1D detector with a step size of 0.0525° over an angular range of 2θ=10-90° and a count time of 12 S.

Low Angle X-Ray Powder Diffraction (LA-XRD)

The ordered mesoporous structure was studied by low-angle XRD patterns recorded using Cu Ka radiation in transmission mode on a Panalytical Empyrean diffractometer (PANalytical X'Pert, Royston, UK) equipped with a focusing mirror on the incident beam and a X'Celerator linear detector. The scans were collected within the range of 0.3-6.0 with a step of 0.017.

Surface Area and Pore Size

Nitrogen ($N_2$) adsorption-desorption porosimetry was performed on the grounded powders (Gemini V, Micromeritics, Hertfordshire, UK); in particular, the specific surface area (SSA) was assessed by using the Brunauer-Emmet-Teller (BET) method, whereas the pores size distribution was determined from the desorption branch of the isotherm through the Broekhoff-de Boer (BdB) method and the BJH method. Samples were outgassed at 270° C. for 6 h before recording the adsorption measurements.

Fourier-Transform Infrared (FTIR) Spectroscopy

FTIR was performed using an FTIR-2000 instrument equipped with Timebase software (Perkin Elmer, Seer Green, UK) with attenuated total reflectance accessory (Golden Gate, Specac, Orpington, UK). Measurements were performed at room temperature in absorbance mode in the range of 1400-600 cm$^{-1}$.

$^{31}$P-MAS NMR $^{31}$P magic angle spinning solid-state nuclear magnetic resonance spectra (AVANCE III, Bruker, Coventry, UK) were recorded and referenced to the resonance of the secondary reference ammonium dihydrogen phosphate (NH$_4$H$_2$PO$_4$) at 0.9 ppm (relative to 85% H$_3$PO$_4$ solution at 0 ppm). The spectra were recorded at 161.87 MHz using a 4 mm magic angle spinning probe using direct excitation with a 90° pulse and 60 s recycle delay at ambient probe temperature (~25° C.) and at a sample spin rate of 12 kHz. Between 20 and 88 repetitions were accumulated and were processed using DM-fit software.

Scanning Electron Microscopy (SEM)

SEM was performed with a JSM-7100F instrument (Jeol, Welwyn, UK) at an accelerating voltage of 10 kV and working distance of 10 mm. The samples were mounted onto an aluminium stub using carbon conductive tape. The pore size diameters were measured using Image-pro plus software (Media Cybernetics, USA).

Results

Wide Angle X-Ray Powder Diffraction (WA-XRD)

Figure 1:
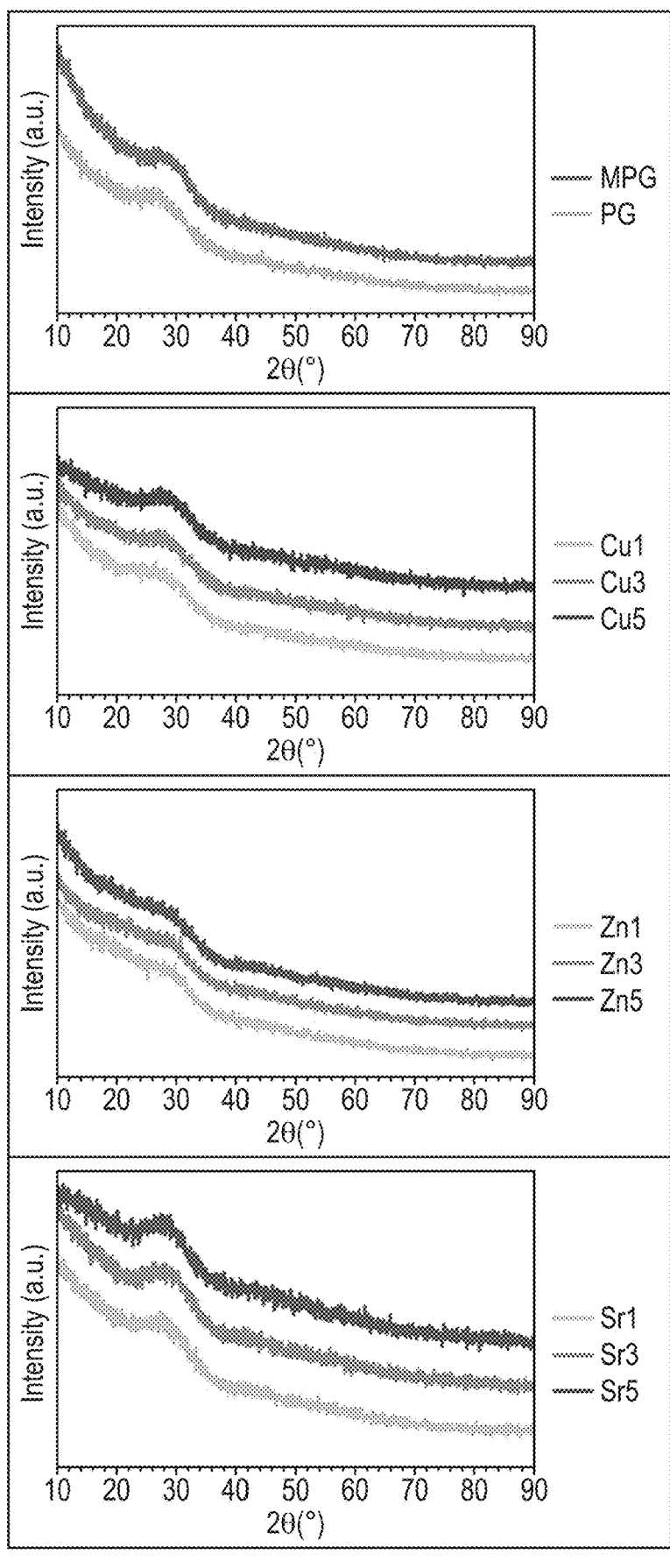

WA-XRD analysis of the non porous PG and mesoporous doped and undoped phosphate-based glass samples (FIG. 1) showed no Bragg peaks and a broad band centred at about ~30° due to the phosphate glass network. Accordingly, the inventors concluded that all of the samples are amorphous.

Low Angle X-Ray Diffraction (LA-XRD)

Figure 2A:
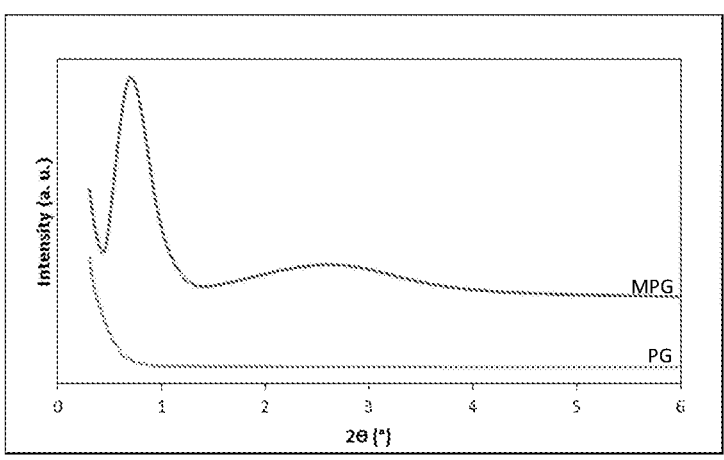
FIG. 2A shows a low angle X-ray diffraction (LA-XRD) pattern of the undoped glasses.
Figure 2B:
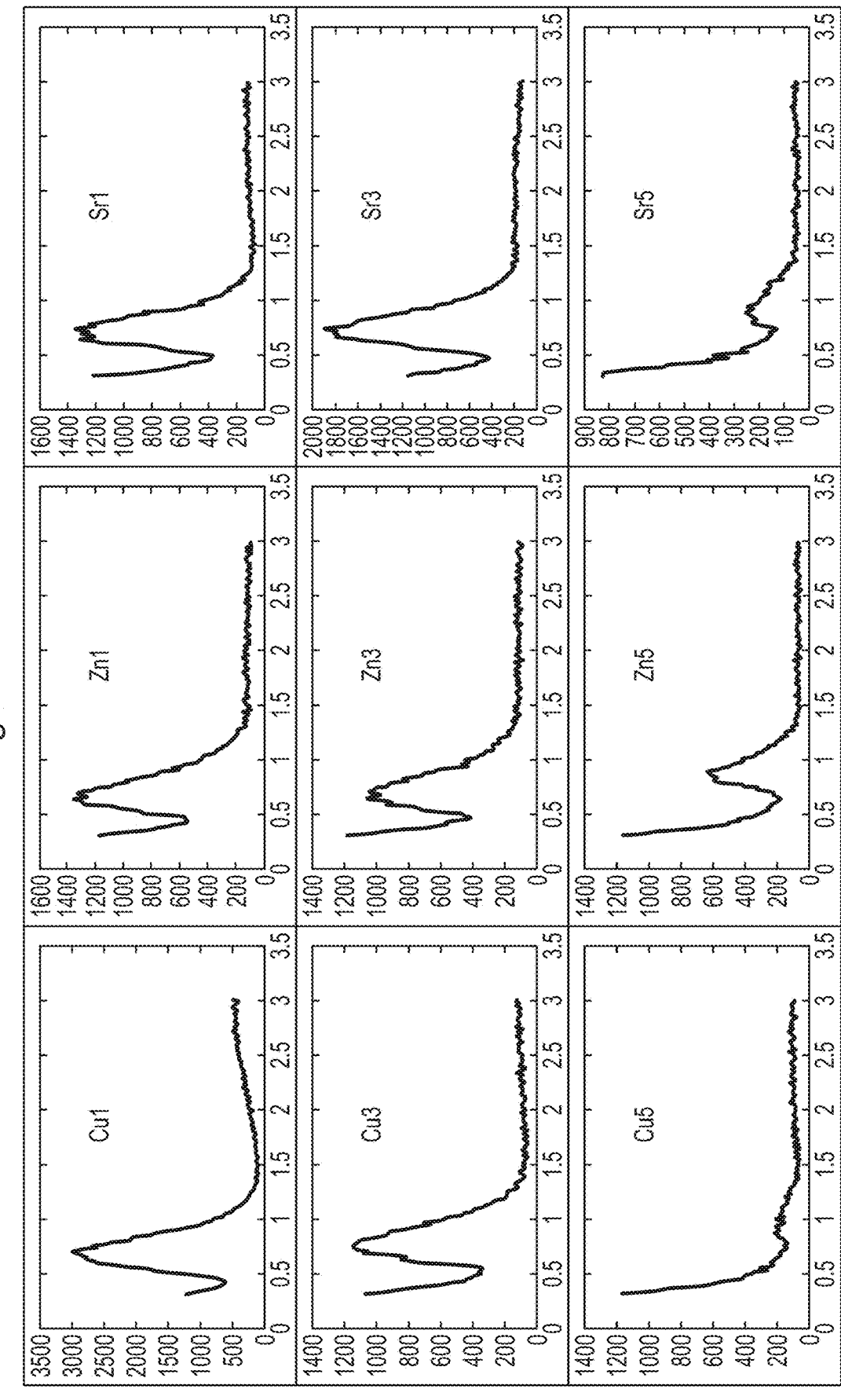
FIG. 2B shows the LA-XRD patterns of the doped glasses.

LA-XRD analysis of the powdered MPG sample showed two peaks at 0.8 and 2.6 degrees which confirmed the short-range ordered mesoporous structure of the prepared sample (FIG. 2A). A similar peak in the range between 0.6-0.9 degrees was observed for the dopes samples (FIG. 2B). No peak was observed for the PG sample between 0.3 and 6.0 degrees.

Surface Area and Pore Size

Figure 3:
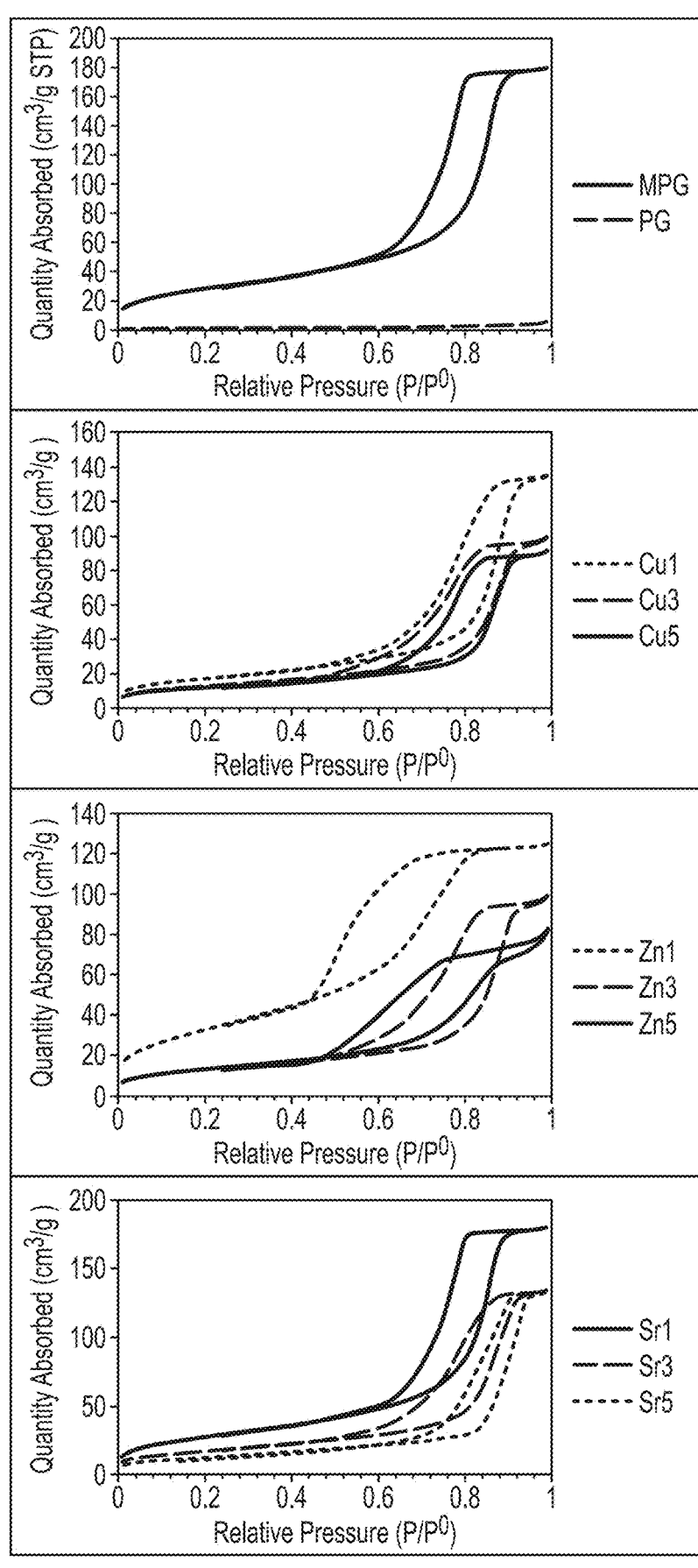
FIG. 3 shows $N_2$ adsorption-desorption isotherms at 77 K for the doped and undoped glasses.
Figure 4:
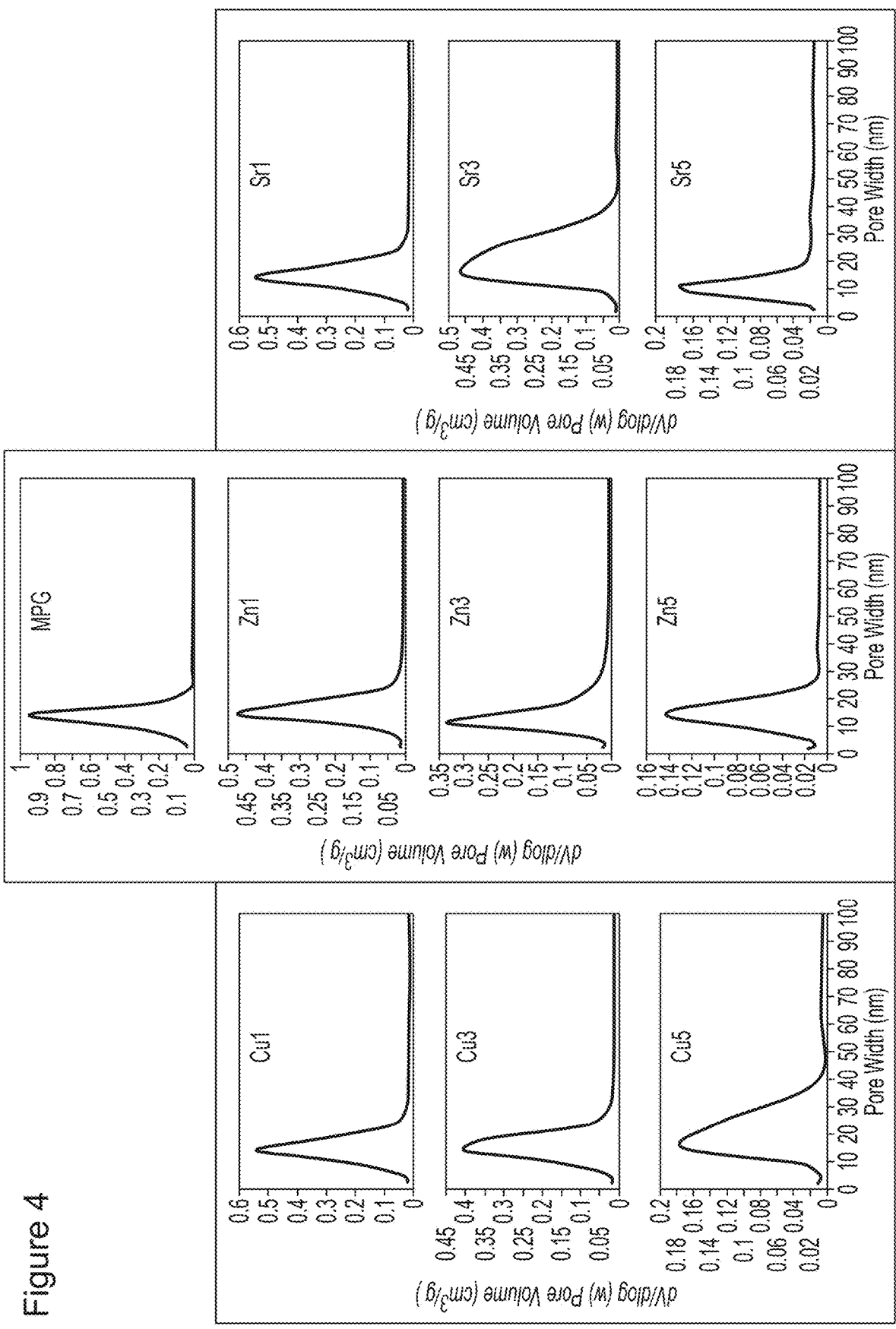
FIG. 4 shows the pore size distribution for MPG and for the doped glasses.

N$_2$ adsorption isotherms for the glasses are shown in FIGS. 3 and 4. All mesoporous glasses show a hysteresis loop typical of mesoporous materials where pores are channel-like. Even if the dopant ion change slightly the shape of the hysteresis loop, the mesoporosity and channel-like structure is preserved.

The calculated values for surface area and pore sizes of the glasses are given in table 2.

TABLE 2

| | Surface are and pore size of phosphate based glasses | |
| --- | --- | --- |
| Sample | Surface Area/ m$^2 \cdot$ g$^{-1}$ | Pore size/nm |
| PG | 4.51 | — |
| MPG | 123 | 11.8 |
| Cu$_1$ | 87 | 12.6 |
| Cu$_3$ | 73 | 12 |
| Cu$_5$ | 70 | 12.2 |
| Zn$_1$ | 92 | 11.3 |
| Zn$_3$ | 82 | 12.1 |
| Zn$_5$ | 76 | 11.7 |
| Sr$_1$ | 112 | 12.3 |
| Sr$_3$ | 94 | 11.4 |
| Sr$_5$ | 73 | 12 |

The surface areas of the MGP and the doped samples are between 70 and 123 m$^2 \cdot$g$^{-1}$. These values are significantly higher than the surface area of the PG sample (4.5 m$^2 \cdot$g$^{-1}$). The average pore size for the MGP and doped samples is 12 nm.

Fourier-Transform Infrared (FTIR) Spectroscopy

Figure 5:
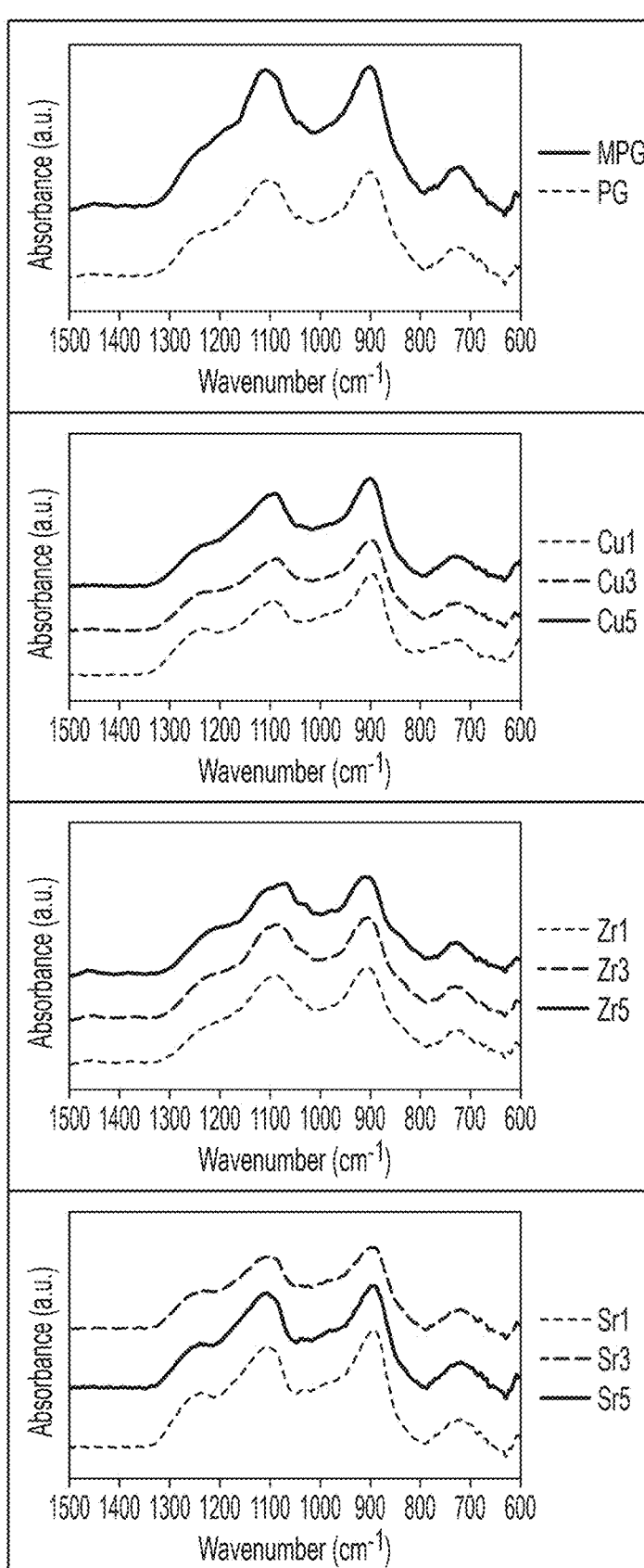
FIG. 5 shows Fourier-transform infrared (FTIR) spectra of the undoped and doped glasses.

FIG. 5 shows FTIR data for the MGP and the doped samples. The peak at 730 cm$^{-1}$ can be assigned to the symmetrical stretching υs (P—O—P) mode, while the peak at 900 cm$^{-1}$ can be assigned to the asymmetrical stretching υas (P—O—P) mode (Q$^2$ phosphate units). The peaks at 1100 and 1235 cm$^{-1}$ can be assigned to asymmetrical υas (PO$_3$)$^{-2}$ and υas (PO$_2$) (Q$^1$ and Q$^2$ phosphate units, respectively). [18, 19].

$^{31}$P-MAS NMR

Figure 6:
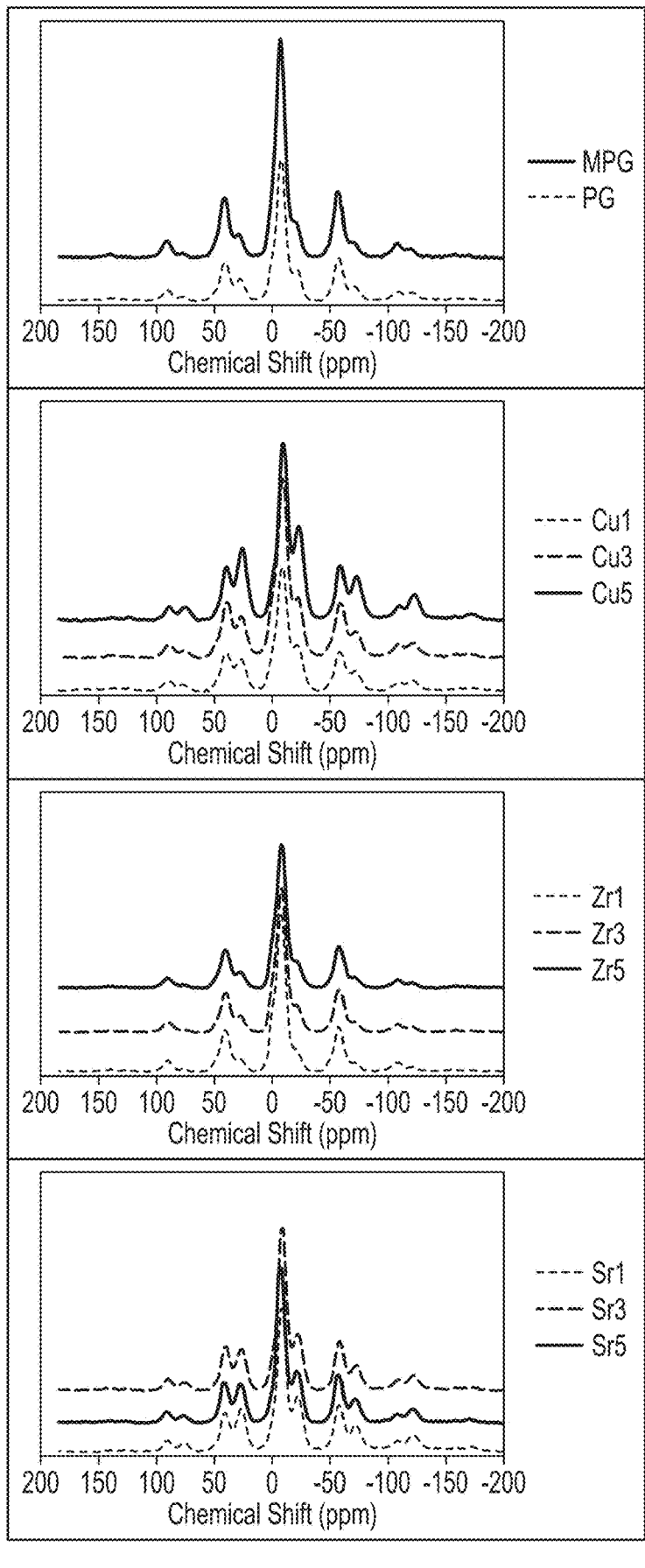
FIG. 6 show the 31P-MAS NMR spectra of the undoped and doped glasses.

The $^{31}$P-MAS NMR spectra are presented in FIG. 6. All peaks were fitted by the DM-fit software and the isotropic chemical shifts and relative properties are reported in Table 3. The main peak with chemical shifts in the range of −6.3 to −6.6 ppm is attributed to Q$^1$ phosphate group [20]. The less intense peak occurring between −23.7 and −23.4 ppm correspond to the Q$^2$ phosphate groups. Peaks marked with an asterisk are spinning sidebands.

TABLE 3

| $^{31}$P-MAS NMR peak parameters of the PG and MPG glasses. | | |
| --- | --- | --- |
| Sample | Q$^n$ species | Abundance (%, ±1) |
| PG | Q$^1$ | 73 |
| | Q$^2$ | 27 |
| MPG | Q$^1$ | 68 |
| | Q$^2$ | 32 |
| Cu$_1$ | Q$^1$ | 65 |
| | Q$^2$ | 35 |
| Cu$_3$ | Q$^1$ | 63 |
| | Q$^2$ | 37 |
| Cu$_5$ | Q$^1$ | 58 |
| | Q$^2$ | 42 |
| Zn$_1$ | Q$^1$ | 67 |
| | Q$^2$ | 33 |
| Zn$_3$ | Q$^1$ | 65 |
| | Q$^2$ | 35 |
| Zn$_5$ | Q$^1$ | 64 |
| | Q$^2$ | 36 |
| Sr$_1$ | Q$^1$ | 62 |
| | Q$^2$ | 38 |
| Sr$_3$ | Q$^1$ | 62 |
| | Q$^2$ | 38 |
| Sr$_5$ | Q$^1$ | 60 |
| | Q$^2$ | 40 |

The presence of Q$^2$ phosphate groups indicates that the phosphorus has two bridging oxygens, suggesting that there is good connectivity in the glass. This is advantageous, and suggests that the dissolution rate of the composition could be modified for a specific application by making minor modifications to the composition.

Scanning Electron Microscopy (SEM)

Figure 7:
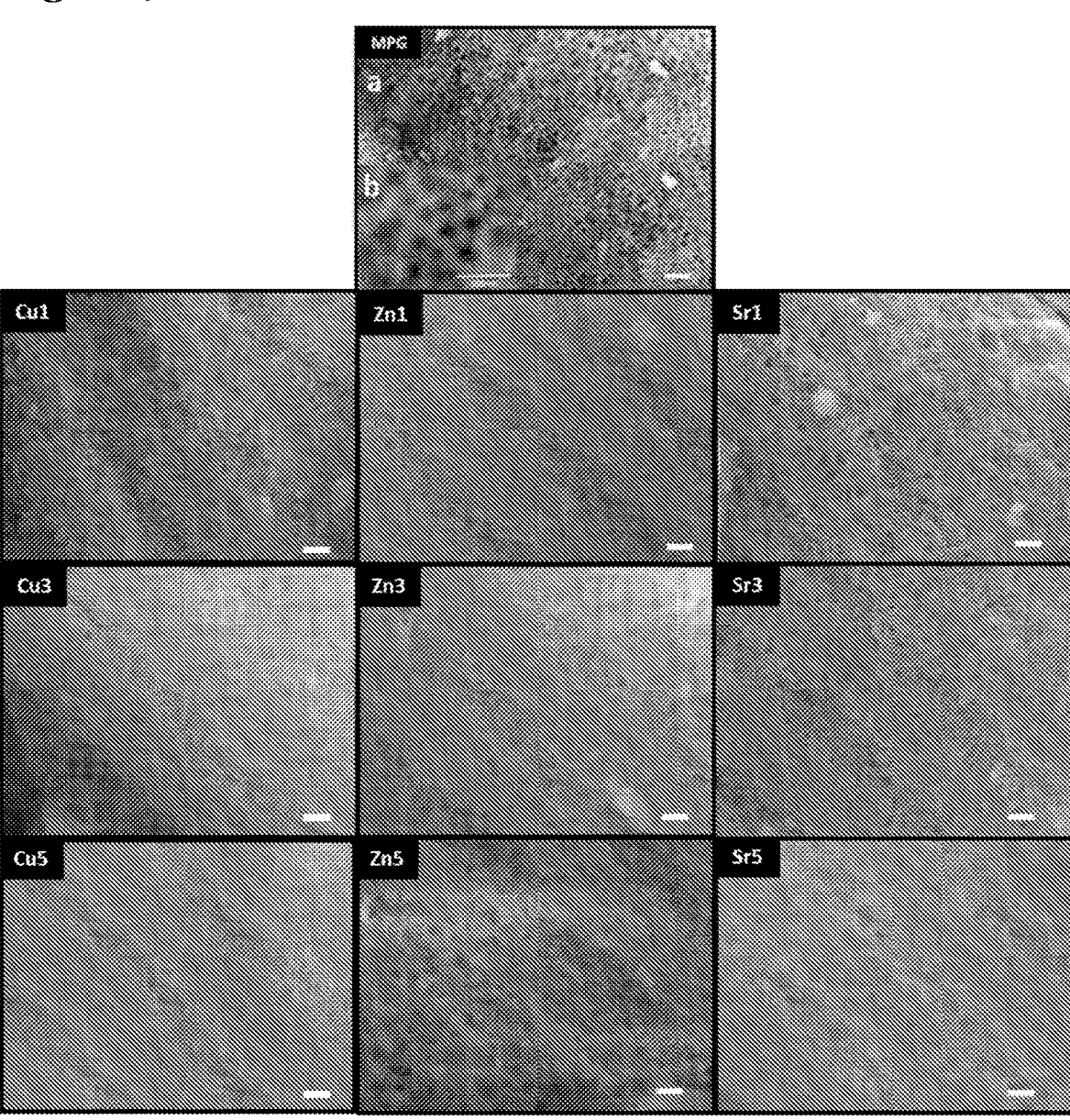
FIG. 7 shows SEM images of MPG at two different magnifications, Cu1, Cu3, Cu5, Zn1, Zn3, Zn5, Sr1, Sr3, and Sr5. The SEM images show details of the hexagonal arrangement of mesopores.

FIG. 7 shows the SEM images of the MPG sol-gel synthesised sample. The hexagonal arrangement of the channel-like pores can be clearly seen in the magnified image.

EXAMPLE 2—DISSOLUTION AND PH STUDIES

Materials and Methods

The samples prepared in Example 1 where used for dissolution and pH studies.

For the dissolution study, 10 mg powders of each sample were immersed in 10 mL of deionised water for 1, 3, 5 and 7 days (n=3). The resulting suspensions for each time points were then centrifuged at 4,800 rpm for 10 min to separate the glass particles from the solution. Phosphorus, calcium and sodium content release in the solution were subsequently measured by ICP-OES (720ES-Varian, Crawley, UK) calibrated across the predicted concentration range using standard solutions (ICP multi-element standard solution, VWR). Additionally, content of the ion dopant released (copper, zinc or strontium) was also measured. Both samples and standards were diluted in 1:1 in 4% $HNO_3$ (Fluka) and analysed in reference to a blank (2% $HNO_3$) solution.

For the pH study, 10 mg powders of each sample were immersed in 10 mL deionised water (pH 7.0 f 0.1) and stored at 37° C. for up to 7 days (n=3). The pH of the solution was measured after 0, 1, 3, 5 and 7 days using Orion pH meter (Thermo scientific-Orion star, UK).

Results

Figure 8:
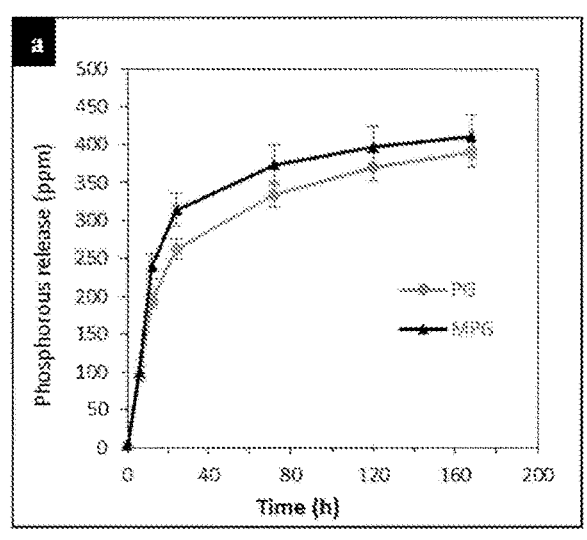
Figure 8:
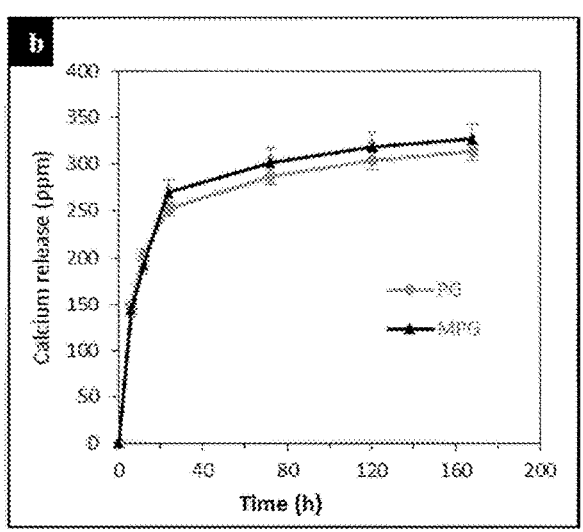
Figure 8:
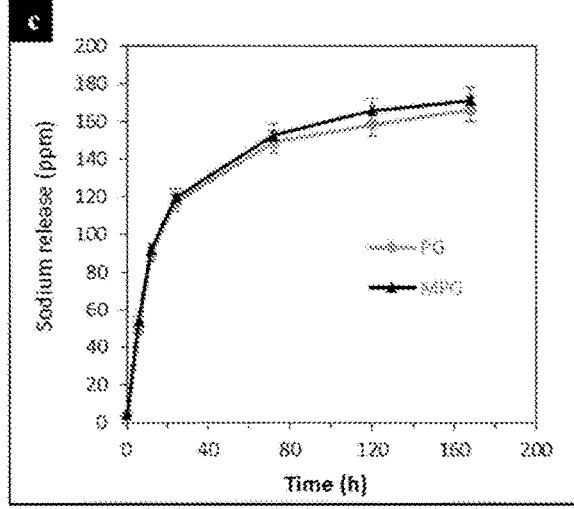
Figure 8:
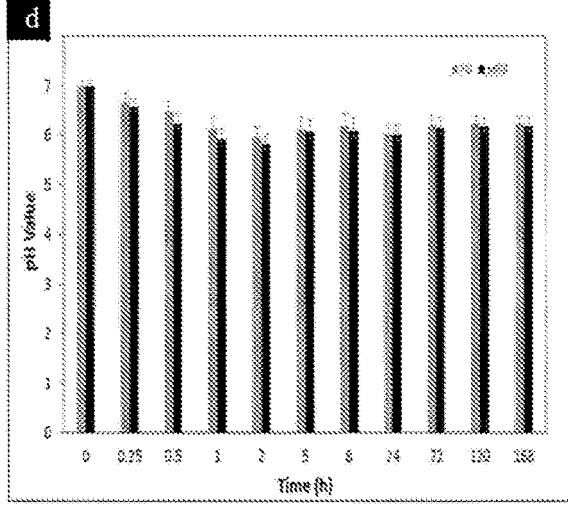

ICP-OES analysis was carried out to determine the ionic release profiles from the dissolution of PG and MPG powders after immersion in deionised water for up to 7 days (FIG. 8). The ICP-OES results show that the ion release occurred fastest in the first 24 hours. The degradation of MPG is higher in comparison with the PG sample. This could be related to the higher surface area of MPG pH changes in FIG. 8-*d*, the initial reduction in pH after 2 h was related to the hydrated phosphate chains dissociating into the solution. However, the pH value increases from 5 to 8 h, which can be related to the presence of $Na^+$ ions in the solution. These results are in agreement with the degradation results.

FIG. 9 shows that the addition of copper, zinc, or strontium slightly slows down the degradation of the synthesised glasses.

EXAMPLE 3—CELL VIABILITY

Materials and Methods

The samples produced in Example 1 where used in the cell viability studies.

Simulated body fluid (SBF) was prepared according to the methods taught by T. Kokubo, H. Kushitani, S. Sakka, T. Kitsugi and T. Yamamuro, "Solutions able to reproduce in vivo surface-structure changes in bioactive glass-ceramic A-W", J. Biomed. Mater. Res., 24, 721-734 (1990).

Immersion Test

To determine the biocompatibility of the PG and undoped MPG particles an immersion test in simulated body fluid (SBF) for 24 h at 37° C. was performed. SBF is a solution with an ion concentration close to that of human blood plasma. X-ray powder diffraction (XRD) of the PG and undoped MPG particles was conducted before and after the immersion test.

HaCat Skin Cell Viability Assay

HaCat skin cells were plated directly into 96-well assay plates at a density of 4000 cells/well and cultured in the presence of ionic release products generated from the dissolution of 1.0 mg/mL PG and MPG in DMEM. After 24 h in culture, cells were placed in contact with the different materials and cultured for 7 days with cell viability assessment during the culture period (after 1, 3, 5, and 7 days) by staining the cells with 1 μM calcein-AM and 2 μM ethidium homodimer-1 (Live/dead assay; Invitrogen) for 15 min. Images of green fluorescent viable cells and red fluorescent dead cell nuclei were acquired in the same well-plates using an Olympus IX81 inverted microscope equipped with a UPlanSApo 10 objective (UIS2 series). All conditions were tested in triplicate.

Fibroblast Cell Viability Assay

Fibroblast cells were treated with 10 mg/mL of the PG or MPG glass powders. The cell viability was monitored after 24 h and compared with a control.

Human skin fibroblast cells were procured from ATCC and cultured in Dulbecco's modified Eagle's medium (DMEM, Gibco) supplemented with 20% fetal bovine serum (FBS, Gibco, Invitrogen) and 1% antibiotic-antimycotic (Thermo Scientific, UK) in a humidified incubator at 5% $CO_2$ and 37° C. On reaching 90% confluency, cells were passaged and used for cell viability assay of the glass powders. The cell viability assay was performed using 96-well plates. Fibroblast cells were treated with 10 mg/mL of the PG and MPG powders and MiliQ water was used as a control. Culture media was removed from the well-plate and cells were washed in PBS after 24 h. Following that tetrazolium based powder was dissolved in PBS and added to each well and absorbance at 570 nm was analysed after 3 h using BioTek plate reader.

Saos-2 Cell Viability Assay

Saos-2, osteosarcoma cells were procured from ATCC and cultured in McCoy's 5a medium (ATCC, UK) with 15% fetal bovine serum (FBS, Gibco, Invitrogen) and 1% antibiotic-antimycotic (Thermo Scientific, UK) in a humidified incubator at 5% $CO_2$ and 37° C. On reaching 90% confluency, cells were passaged and used for cytocompatibility analysis for the materials. To facilitate the attachment of the cells on to the materials, polycarbonate cell culture inserts with 0.4 μm pore size (Merck Millipore) was used. Materials were placed on the inserts and incubated with medium overnight. $1.2 \times 10^4$ cells were placed in each insert with the different materials and cultured for 8 days with cell viability assessment during the culture period. Cells only on inserts was used as control for comparison purposes.

Alamar Blue assay was carried out on days 1, 3, 5 and 8 to assess cell viability and growth. Cells were incubated for 2 hours in a 10% Alamar Blue (ThermoFisher, UK) solution followed by fluorescence measurement with a BioTek plate reader at 530 nm excitation and 590 nm emission as a direct estimation of cell growth on the different materials.

DAPI-Phalloidin Staining

At the end of day 8, the cells were fixed using 4% paraformaldehyde and stained with DAPI-Phalloidin for visualisation of the nucleus and actin filaments. Cells were incubated for 20 mins at room temperature in staining solution containing 2.5 μl of DAPI (1 mg/ml stock solution), 4 μl of Phalloidin (200 U/ml stock concentration, Alexa Fluor 488, Phalloidin, Life Technologies) and 20 μl of Triton X per ml of PBS. Cells were then visualised using Cytation5 Cell Imaging Multimode Reader (Biotek).

Results

SBF Immersion Test

As shown in FIG. 10, XRD analysis of the PG and MPG samples show the formation of hydroxyapatite only on the MPG sample after 24 h immersion. It is noted that the peaks matches with hydroxyapatite standard (ICDD-9-432). This suggests that the MPG has great potential for inducing bone regeneration.

HaCat Skin Cell Viability Assay

FIG. 14 shows the Hacat cell viability measurement using the Alamar blue fluorescence assay for the PG and MPG after 1, 3, 5 and 7 days. As it can be seen for the MPG sample the fluorescence intensity is higher than the control which confirms the potential application of MPG in soft tissue regeneration and more specifically wound healing.

Fibroblast Cell Viability Assay

As shown in FIG. 11, the PG (non-porous) glass is similar to the control after 24 h. However, for the MPG powder the cell viability is about two folds higher compared to the control.

Saos-2 Cell Viability Assay

Saos-2 cell viability measurement using the Alamar blue fluorescence assay the PG and MPG after 1, 3, 5, and 8 days is shown in FIG. 12. The MPG shows higher fluorescence intensity compared with the PG samples. This confirms that the cells attached to the MPGs, and the MPGs could therefore be used for bone tissue regeneration. These results are confirmed by fluorescent microscopic micrographs shown in FIG. 13 and the SEM images of the powders of Saos-2 cells stained by DAPI after 8 days shown in FIG. 14. FIG. 13A shows a mono layer of cells disposed on the culture support. FIGS. 13B and 13C show cells attached on PG and MPG particles respectively. The green fluorescent stain shows filamentous actin and the blue shows nuclei. More actin is observed in FIG. 13C as the cells are attaching to MPG particles.

EXAMPLE 4—ANTIBACTERIAL STUDY

Materials and Methods

The samples produced in Example 1 where used in the antibacterial studies.

An additional sample (Cu10) was also prepared. The method used to prepare this sample was the same as described in Example 1, except the amounts of NaOMe and Cu-acetate used were modified to ensure that the final composition comprised 5 mol % $Na_2O$ and 10 mol % CuO.

Antibacterial Study

Universal tubes with Tryptic Soy Broth (TSB) were inoculated with 50 mg of glass powders containing increasing Cu concentrations up to 10 mol % Cu and an overnight culture of Staphylococcus aureus (S. aureus) and Escherichia coli (E. coli) at $10^6$ CFU/mL. Tubes were incubated at 37° C. for 3 days at 250 rpm and samples were collected after 1, 2 and 3 days to calculate viable CFU/mL of S. aureus and E. coli for each time point. For both antimicrobial tests the overnight bacterial cultures were obtained in TSB at 37° C. for 24 hours, at 250 rpm and the experiments were conducted as two biological replicates. Undoped mesoporous glass (MPG) was used as negative controls (identified as "0%"). No glass was added to samples as a positive control (identified as "control").

Results

FIGS. 16 and 17 show bactericidal property of mesoporous glasses containing increasing concentrations of Cu against S. aureus and E. coli. As indicated there is a significant difference between the Cu-doped MPG compared to the control and undoped MPG. In particular, on day 1 the mesoporous glass comprising 10 mol % Cu exhibits a significant difference when compared with both the positive and negative controls, demonstrating a rapid bactericidal effect, and this difference becomes more significant on days 2 and 3.

EXAMPLE 5—DRUG DELIVERY APPLICATIONS

The samples prepared in Example 1 where used to evaluate the potential drug loading applications of MPG.

Materials and Methods

A 1 wt % solution of tetracycline hydrochloride (TCH) in ethanol was prepared by dissolving TCH in ethanol at room temperature. PG and MPG samples prepared as described in Example 1, and 100 mg of the PG/MPG samples were then immersed in 10 ml of the solution at 37° C. and the mixture was shaken for 1 hour. The solutions were then centrifuged at 4000 rpm for 10 min to obtain the loaded PG and MPG samples, which were collected and dried in an oven at 60° C. for 2 h.

Antibacterial Study

Universal tubes with TSB were inoculated with 50 mg of TCH loaded PG and MPG samples and an overnight culture of S. aureus at $10^6$ CFU/mL. Tubes were incubated at 37° C. at 250 rpm and samples were collected after 1 day to calculate viable CFU/mL of S. aureus colonies. Unloaded PG and MPG samples were used at the same concentration as negative controls. No glass was added to samples as a positive control (identified as "control").

TCH Release Study

TCH release from 50 mg of TCH loaded PG and MPG samples was measured in the region of 300-500 nm using UV-Visible spectrometer (BioChrom Libra, Cambridge, UK) after 10, 30 and 120 min immersion in 5 ml deionised water. The peak at 356 nm (according to the standard calibration for TCH) was used for measuring the amount of loaded TCH for PG and MPG samples.

Results

The UV-Vis study results show that the MPG can hold about 7 times as much of an active agent compared to the same amount of PG, see FIG. 19. The inventors believe that this is due to the mesoporous structure of the MPG facilitating effective loading. Accordingly, the MPG samples loaded with TCH (a known antibiotic) showed improved antibacterial properties compared to PG loaded with TCH, or positive or negative controls.

CONCLUSIONS

The inventors have developed a novel-gel synthesis of mesoporous phosphate based glasses for potential biomedical applications. MPGs were successfully synthesised using non-ionic block copolymer EO20 PO70 EO20 (P123). The synthesised glasses were analysed using several characterisation techniques, including wide angle x-ray diffraction (WA-XRD), low angle x-ray diffraction (LA-XRD), $^{31}$P magic angle spinning nuclear magnetic resonance ($^{31}$P-MAS NMR), Fourier transform infrared spectroscopy (FTIR), scanning electron microscopy (SEM) and $N_2$ adsorption surface analysis (BET). The WA-XRD and LA-XRD results confirmed the amorphous structure for the prepared samples. Moreover, the 31P MAS-NMR and FTIR results revealed that the glass structure consist of mainly $Q^1$ and $Q^2$ phosphate units. The BET study on MPG confirmed the high specific surface area of around 123 $m^2$/g with the pore size of 12 nm.

The degradation was also assessed via inductively coupled plasma-optical emission spectroscopy (ICP-OES). The inventors note that the degradation product can be easily metabolised in the body. This makes the glasses an excellent candidate for both local drug delivery systems and bone tissue regeneration applications.

Cell studies were performed on Saos-2, HaCat, and fibroblast cells and confirmed the potential applications of these glasses for hard and soft tissue regeneration. The antibacterial properties of Cu doped MPG samples against S. aureus and *E. coli* were also assessed. The results confirmed the potential for these glasses to deliver antibacterial ions to the site of interest.

These glasses have also showing great potential application as a carrier in drug delivery applications for more sustained and controlled drug release. The surfaces of the glasses could be functionalised with specific ligands to target a specific site of interest and slow down the release of a drug molecule until the site of interest has been reached. For instance, the compositions could be functionalised to target cancerous cells in cancer treatment.

REFERENCES

[1] C. N. Kelly, A. T. Miller, S. J. Hollister, R. E. Guldberg, K. Gall, Design and Structure-Function Characterization of 3D Printed Synthetic Porous Biomaterials for Tissue Engineering, Adv Healthc Mater 7(7) (2018).

[2] O. S. Fenton, K. N. Olafson, P. S. Pillai, M. J. Mitchell, R. Langer, Advances in Biomaterials for Drug Delivery, Adv Mater 30(29) (2018).

[3] G. H. Wu, S. H. Hsu, Review: Polymeric-Based 3D Printing for Tissue Engineering, J Med Biol Eng 35(3) (2015) 285-292.

[4] A. R. Armiento, M. J. Stoddart, M. Alini, D. Eglin, Biomaterials for articular cartilage tissue engineering: Learning from biology, Acta Biomater 65 (2018) 1-20.

[5] D. M. Pickup, R. J. Newport, J. C. Knowles, Sol-Gel Phosphate-based Glass for Drug Delivery Applications, J Biomater Appl 26(5) (2012) 613-622.

[6] S. Bhat, L. Lidgren, A. Kumar, In Vitro Neo-Cartilage Formation on a Three-Dimensional Composite Polymeric Cryogel Matrix, Macromol Biosci 13(7) (2013) 827-837.

[7] A. Matsumoto, Y. Matsukawa, T. Suzuki, H. Yoshino, Drug release characteristics of multi-reservoir type microspheres with poly(DL-lactide-co-glycolide) and poly(DL-lactide), J Control Release 106(1-2) (2005) 172-180.

[8] A. L. B. Macon, M. Jacquemin, S. J. Page, S. W. Li, S. Bertazzo, M. M. Stevens, J. V. Hanna, J. R. Jones, Lithium-silicate sol-gel bioactive glass and the effect of lithium precursor on structure-property relationships, J Sol-Gel Sci Techn 81(1) (2017) 84-94.

[9] R. Kaliaraj, S. Gandhi, D. Sundaramurthi, S. Sethuraman, U. M. Krishnan, A biomimetic mesoporous silica-polymer composite scaffold for bone tissue engineering, J Porous Mat 25(2) (2018) 397-406.

[10] S. Kwon, R. K. Singh, R. A. Perez, E. A. Abou Neel, H.-W. Kim, W. Chrzanowski, Silica-based mesoporous nanoparticles for controlled drug delivery, J Tissue Eng 4 (2013) 2041731413503357.

[11] A. Nemmar, S. Beegam, P. Yuvaraju, J. Yasin, A. Shahin, B. H. Ali, Interaction of Amorphous Silica Nanoparticles with Erythrocytes in Vitro: Role of Oxidative Stress, Cell Physiol Biochem 34(2) (2014) 255-265.

[12] S. Murugadoss, D. Lison, L. Godderis, S. Van den Brule, J. Mast, F. Brassinne, N. Sebaihi, P. H. Hoet, Toxicology of silica nanoparticles: an update, Arch Toxicol 91(9) (2017) 2967-3010.

[13] X. Yang, X. J. Liu, Y. Y. Li, Q. L. Huang, W. He, R. R. Zhang, Q. L. Feng, D. Benayahu, The negative effect of silica nanoparticles on adipogenic differentiation of human mesenchymal stem cells, Mat Sci Eng C-Mater 81 (2017) 341-348.

[14] L. J. Chen, J. Liu, Y. L. Zhang, G. L. Zhang, Y. Y. Kang, A. J. Chen, X. L. Feng, L. Q. Shao, The toxicity of silica nanoparticles to the immune system, Nanomedicine-Uk 13(15) (2018) 1939-1962.

[15] I. Ahmed, M. Lewis, I. Olsen, J. C. Knowles, Phosphate glasses for tissue engineering: Part 1. Processing and characterisation of a ternary-based P(2)O(5)-CaO—Na(2)O glass system, Biomaterials 25(3) (2004) 491-499.

[16] J. C. Knowles, Phosphate based glasses for biomedical applications, J Mater Chem 13(10) (2003) 2395-2401.

[17] E. A. Abou Neel, D. M. Pickup, S. P. Valappil, R. J. Newport, J. C. Knowles, Bioactive functional materials: a perspective on phosphate-based glasses, J Mater Chem 19(6) (2009) 690-701.

[18] F. Foroutan, N. J. Walters, G. J. Owens, N. J. Mordan, H. W. Kim, N. H. de Leeuw, J. C. Knowles, Sol-gel synthesis of quaternary (P2O5)(55)-(CaO)(25)-(Na2O)((20-x))-(TiO2)(x) bioresorbable glasses for bone tissue engineering applications (x=0, 5, 10, or 15), Biomed Mater 10(4) (2015).

[19] F. Foroutan, N. H. de Leeuw, R. A. Martin, G. Palmer, G. J. Owens, H. W. Kim, J. C. Knowles, Novel sol-gel preparation of (P2O5)(0.4)-(CaO)(0.25)-(Na2O)(X)—(TiO2)((0.35-X)) bioresorbable glasses (X=0.05, 0.1, and 0.15), J Sol-Gel Sci Techn 73(2) (2015) 434-442.

[20] I. H. Lee, F. Foroutan, N. J. Lakhkar, M. S. Gong, J. C. Knowles, Sol-gel synthesis and structural characterization of P2O5-CaO—Na2O glasses, Phys Chem Glasses-B 54(3) (2013) 115-120.

The invention claimed is:

1. A method of producing a mesoporous phosphate-based glass comprising between 40 and 90 mol % phosphorus pentoxide, the method comprising:

contacting a phosphate with an alcohol and/or a glycol ether to create a reaction mixture; wherein the phosphate is $PO(OC_4H_9)_3$, $PO(OC_4H_9)_2(OH)$ or $PO(OC_4H_9)$ $(OH)_2$, or a combination thereof;

contacting the reaction mixture with alkali metal cations and/or alkaline earth metal cations;

contacting the alcohol, the glycol ether or the reaction mixture with a surfactant, wherein the surfactant is configured to provide channel-like pores in the resultant mesoporous phosphate-based glass;

allowing the reaction mixture to gel; and calcinating the gel to obtain the mesoporous phosphate-based glass;

thereby producing a mesoporous phosphate-based glass comprising between 40 and 90 mol % phosphorus pentoxide.

2. The method of claim 1, wherein the molar ratio of the phosphate to the alcohol and/or glycol ether is between 1:20 and 20:1.

3. The method of claim 1, wherein the alkali metal cations and/or alkaline earth metal cations comprise lithium cations, sodium cations, potassium cations, rubidium cations, beryllium cations, magnesium cations, calcium cations and/or strontium cations.

4. The method of claim 1, wherein the molar ratio of the alkaline earth metal cation to the phosphate is between 1:50 and 50:1.

5. The method of claim 1, wherein the method comprises contacting the reaction mixture with an antimicrobial agent.

6. The method of claim 1, wherein the method comprises contacting the reaction mixture with the surfactant subsequently to contacting the reaction mixture with alkali metal cations and/or alkaline earth metal cations.

7. The method of claim 1, wherein the molar ratio of the phosphate to the surfactant is between 1:1 and 1,000:1.

8. The method of claim 1, wherein the surfactant is a copolymer.

9. The method of claim 8, wherein the copolymer has a molar mass between 500 and 50,000.

10. The method of claim 1, wherein calcinating the gel comprises exposing the gel to an elevated temperature between 100° C. and 1,000° C.

11. The method of claim 1, wherein, subsequent to calcinating the gel, the method comprises loading the phosphate-based glass with an organic molecule.

12. A mesoporous phosphate-based glass comprising between 40 and 90 mol % phosphorus pentoxide obtained or obtainable by a method comprising:

contacting a phosphate with an alcohol and/or a glycol ether to create a reaction mixture, wherein the phosphate is $PO(OC_4H_9)_3$, $PO(OC_4H_9)_2(OH)$ or $PO(OC_4H_9)(OH)_2$, or a combination thereof;

contacting the reaction mixture with alkali metal cations and/or alkaline earth metal cations;

contacting the alcohol, the glycol ether or the reaction mixture with a surfactant, wherein the surfactant is configured to provide channel-like pores in the resultant mesoporous phosphate-based glass;

allowing the reaction mixture to gel; and calcinating the gel to obtain the mesoporous phosphate-based glass.

13. The phosphate-based glass according to claim 12, wherein the pores have an average diameter between 3 and 40 nm.

14. The phosphate-based glass according to claim 12, wherein the phosphate based glass comprises one or more of:

between 40 and 80 mol % phosphorus pentoxide;

between 5 and 60 mol % alkaline earth metal oxide;

between 1 and 50 mol % alkali metal oxide.

15. The phosphate-based glass according to claim 12, wherein, the phosphate-based glass is amorphous.

16. The phosphate-based glass according to claim 12, wherein the phosphate-based glass has a high degree of connectivity, wherein the phosphate-based glass is considered to have a high degree of connectivity if a Fourier-transform infrared (FTIR) spectra of the glass indicates the presence of $Q^1$ and $Q^2$ species, wherein a $Q^1$ species is indicated by a peak in the FTIR spectra between 1,025 and 1,150 cm$^{-1}$ and a $Q^2$ species is indicated by a peak in the FTIR spectra between 800 and 975 cm$^{-1}$ and/or a peak in the FTIR spectra between 1,175 and 1,350 cm$^{-1}$.

17. A phosphate-based glass comprising:

between 40 and 90 mol % phosphorus pentoxide;

between 5 and 60 mol % alkaline earth metal oxide and/or between 1 and 50 mol % alkali metal oxide; and pores with an average diameter of between 2 and 50 nm, wherein the pores are channel-like.

18. The phosphate-based glass according to claim 17, wherein the pores have an average diameter between 3 and 40 nm.

19. The phosphate-based glass according to claim 17, wherein the phosphate based glass comprises one or more of:

between 40 and 80 mol % phosphorus pentoxide;

between 5 and 60 mol % alkaline earth metal oxide;

between 1 and 50 mol % alkali metal oxide.

20. A method of (a) treating a microbial infection, (b) drug delivery, (c) bone regeneration and/or (d) wound healing, the method comprising administering the phosphate-based glass according to claim 17 to a patient in need thereof.

* * * * *